(12) United States Patent
Elam et al.

(10) Patent No.: US 11,648,546 B2
(45) Date of Patent: May 16, 2023

(54) ARTIFICIAL ZEOLITES

(71) Applicant: UChicago Argonne, LLC, Chicago, IL (US)

(72) Inventors: Jeffrey W. Elam, Elmhurst, IL (US); Christian P. Canlas, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 14/609,276

(22) Filed: Jan. 29, 2015

(65) Prior Publication Data

US 2016/0220989 A1     Aug. 4, 2016

(51) Int. Cl.

| | |
|---|---|
| B01J 37/02 | (2006.01) |
| B01J 31/22 | (2006.01) |
| B01J 35/00 | (2006.01) |
| B01J 35/02 | (2006.01) |
| B01J 35/10 | (2006.01) |
| B01J 37/34 | (2006.01) |
| B01J 29/06 | (2006.01) |
| B01J 21/12 | (2006.01) |

(52) U.S. Cl.
CPC ............ B01J 31/22 (2013.01); B01J 21/12 (2013.01); B01J 29/06 (2013.01); B01J 35/0006 (2013.01); B01J 35/02 (2013.01); B01J 35/1023 (2013.01); B01J 35/1061 (2013.01); B01J 37/0246 (2013.01); B01J 37/348 (2013.01); B01J 2229/12 (2013.01); B01J 2229/186 (2013.01); B01J 2229/32 (2013.01); B01J 2229/60 (2013.01); B01J 2231/76 (2013.01); B01J 2531/002 (2013.01); B01J 2531/008 (2013.01)

(58) Field of Classification Search
None
See application file for complete search history.

(56) References Cited

U.S. PATENT DOCUMENTS

| | | | |
|---|---|---|---|
| 8,673,804 B2 | 3/2014 | Martens et al. | |
| 2003/0064607 A1* | 4/2003 | Leu | ......... C23C 16/02 438/780 |
| 2011/0137093 A1* | 6/2011 | Martens | ......... C23C 16/20 585/310 |
| 2015/0104574 A1* | 4/2015 | Lee | ......... C23C 16/402 427/255.28 |

OTHER PUBLICATIONS

Bevilacqua, et al., "Are the active sites of protonic zeolites generated by the cavities?," Catalysis Today 116(2), pp. 132-142 (2006).
(Continued)

*Primary Examiner* — Joel G Horning
(74) *Attorney, Agent, or Firm* — Foley & Lardner LLP

(57) ABSTRACT

Zeolites are industrially important materials possessing high Bronsted acidity and shape-selectivity. However, their inherently small pores restrict application for catalytic conversion of bulky molecules. A method of synthesis of 'artificial' zeolites. The artificial zeolites have well-tailored Bronsted and Lewis acid sites prepared on mesostructured silica to circumvent this limitation. This novel approach utilizes atomic layer deposition to tailor both porosity and acid speciation, providing exquisite control over catalytic behavior and enabling systematic studies.

9 Claims, 25 Drawing Sheets

(56) References Cited

OTHER PUBLICATIONS

Canlas & Pinnavaia, "Bio-derived oleyl surfactants as porogens for the sustainable synthesis of micelle-templated mesoporous silica," RSC Advances 2, pp. 7449-7455 (2012).
Canlas, et al., "Shape-selective sieving layers on an oxide catalyst surface," Nature Chemistry 4, pp. 1030-1036 (2012).
Chizallet & Raybaud, "Pseudo-bridging silanols as versatile Bronsted acid sites of amorphous aluminosilicate surfaces," Angewandte Chemie 48(16), pp. 2891-2893 (2009).
Choi, et al., "Amphiphilic organosilane-directed synthesis of crystalline zeolite with tunable mesoporosity," Nature Materials 5, pp. 718-723 (2006).
Choudhary, et al., "Insights into the Interplay of Lewis and Br?nsted Acid Catalysts in Glucose and Fructose Conversion to 5-(Hydroxymethyl)furfural and Levulinic Acid in Aqueous Media," Journal of the American Chemical Society 135(10), pp. 3997-4006 (2013).
Comstock & Elam, "Atomic Layer Deposition of Ga2O3 Films Using Trimethylgallium and Ozone," Chemistry of Materials 24(21), pp. 4011-4018 (2012).
Corma & Garcia, "Lewis Acids: From Conventional Homogeneous to Green Homogeneous and Heterogeneous Catalysis," Chemical Reviews 103(11), pp. 4307-4366 (2003).
Corma, et al., "Acidity and stability of MCM-41 crystalline aluminosilicates," Journal of Cayalysis 148(2), pp. 569-574 (1994).
Corma, et al., "Al-Free Sn-Beta Zeolite as a Catalyst for the Selective Reduction of Carbonyl Compounds (Meerwein-Ponndorf-Verley Reaction)," Journal of the American Chemical Society 124(13), pp. 3194-3195 (2002).
Corma, et al., "Delaminated zeolite precursors as selective acidic catalysts," Nature 396, pp. 353-356 (1998).
Crepeau, et al., "Nature, Structure and Strength of the Acidic Sites of Amorphous Silica Alumina: An IR and NMR Study," The Journal of Physical Chemistry B 110(31), pp. 15172-15185 (2006).
Csicsery, "Shape-selective catalysis in zeolites," Zeolites 4(3), pp. 202-213 (1984).
Derouane, et al., "The Acidity of Zeolites: Concepts, Measurements and Relation to Catalysis: A Review on Experimental and Theoretical Methods for the Study of Zeolite Acidity," Catalysis Reviews 55(4), pp. 454-515 (2013).
Dingemans, et al., "Plasma-Assisted ALD for the Conformal Deposition of SiO2: Process, Material and Electronic Properties," Journal of the Electrochemical Society 159(3), pp. H277-H285 (2012).
Elam, et al., "Viscous flow reactor with quartz crystal microbalance for thin film growth by atomic layer deposition," Review of Scientific Instruments 73, pp. 2981-2987(2002).
Emeis, "Determination of integrated molar extinction coefficients for infrared absorption bands of pyridine adsorbed on solid acid catalysts," Journal of Catalysis 141(2), pp. 347-354 (1993).
Frisch, "Gaussian 09: User's Reference," Gaussian, 402 pages (2009).
Gallo, et al., "Production and upgrading of 5-hydroxymethylfurfural using heterogeneous catalysts and biomass-derived solvents," Green Chemistry 15, pp. 85-90 (2013).
Goldstein, et al., "Al2O3 Atomic Layer Deposition with Trimethylaluminum and Ozone Studied by in Situ Transmission FTIR Spectroscopy and Quadrupole Mass Spectrometry," The Journal of Physical Chemistry C 112(49), pp. 19530-19539 (2008).
Gora-Marek & Datka, "IR studies of OH groups in mesoporous aluminosilicates," Applied Catalysis A: General 302(1), pp. 104-109 (2006).
Haag, et al., "The active site of acidic aluminosilicate catalysts," Nature 309, pp. 589-591 (1984).
Haukka & Root, "The reaction of hexamethyldisilazane and subsequent oxidation of trimethylsilyl groups on silica studied by solid-state NMR and FTIR," The Journal of Physical Chemistry 98(6), pp. 1695-1703 (1994).
Hausmann, et al., "Rapid Vapor Deposition of Highly Conformal Silica Nanolaminates," Science 298(5592), pp. 402-406 (2002).

Hunger, "Multinuclear solid-state NMR studies of acidic and non-acidic hydroxyl protons in zeolites," Solid State Nuclear Magnetic Resonance 6(1), pp. 1-29 (1996).
Jiao, et al., "29Si and 27Al MAS NMR characterization of non-hydrated zeolites Y upon adsorption of ammonia," Microporous and Mesoporous Materials 90(1-3), pp. 246-250 (2006).
Jiao, et al., "Effects of Adsorbate Molecules on the Quadrupolar Interaction of Framework Aluminum Atoms in Dehydrated Zeolite H,Na—Y,"The Journal of Physical Chemistry B 110(28), pp. 13812-13818 (2006).
Jiao, et al., "State of Aluminum in Dealuminated, Nonhydrated Zeolites Y Investigated by Multinuclear Solid-State NMR Spectroscopy," The Journal of Physical Chemistry B 108(38), pp. 14305-14310 (2004).
Karge, "Characterization by IR spectroscopy," Verified Syntheses of Zeolitic Materials 2nd Revised Edition, pp. 69-71 (2001).
Klaus & George, "Atomic layer deposition of SiO2 at room temperature using NH3-catalyzed sequential surface reactions," Surface Science 447(1-3), pp. 81-90 (2000).
Klaus, et al., "Atomic layer controlled growth of SIO2 films using binary reaction sequence chemistry," Applied Physics Letters 70, 1092 (1997).
Kresge, et al., "Ordered mesoporous molecular sieves synthesized by a liquid-crystal template mechanism," Nature 359, pp. 710-712 (1992).
Kress & Hafner, "Ab initio molecular dynamics for liquid metals," Physical Review B 47(1), pp. 558-561 (1993).
Kresse & Furthmuller, "Efficiency of ab-initio total energy calculations for metals and semiconductors using a plane-wave basis set," Computational Materials Science 6(1), pp. 15-50 (1996).
Kresse & Furthmuller, "Efficient iterative schemes for ab initio total-energy calculations using a plane-wave basis set," Physical Review B 54(16), pp. 169-186 (1996).
Kresse & Hafner, "Ab initio molecular-dynamics simulation of the liquid-metal-amorphous-semiconductor transition in germanium," Physical Review B 49(20), pp. 251-269 (1994).
Leydier, et al., "Bronsted acidity of amorphous silica-alumina: The molecular rules of proton transfer," Journal of Catalysis 284(2), pp. 215-229 (2011).
Li, et al., "Direct Synthesis of Al-SBA-15 Mesoporous Materials via Hydrolysis-Controlled Approach," The Journal of Physical Chemistry B 108(28), pp. 9739-9744 (2004).
Lu, et al., "Coking- and Sintering-Resistant Palladium Catalysts Achieved Through Atomic Layer Deposition," Science 335(6073), pp. 1205-1208 (2012).
Lu, et al., "Porous Alumina Protective Coatings on Palladium Nanoparticles by Self-Poisoned Atomic Layer Deposition," Chemistry of Materials 24(11), pp. 2047-2055 (2012).
Lu, et al., "Toward atomically-precise synthesis of supported bimetallic nanoparticles using atomic layer deposition," Nature Communications 5, 3264, 9 pagesg (2014).
Luan, et al., "Alumination and Ion Exchange of Mesoporous SBA-15 Molecular Sieves," Chemistry of Materials 11(6), pp. 1621-1627 (1999).
Moliner, et al., "Tin-containing zeolites are highly active catalysts for the isomerization of glucose in water," Proceedings of the National Academy of Sciencese of the United States of America 107(14), pp. 6164-6168 (2010).
Nikolla, et al., ""One-Pot" Synthesis of 5-(Hydroxymethyl)furfural from Carbohydrates using Tin-Beta Zeolite," ACS Catalysis 1(4), pp. 408-410 (2011).
Omegna, et al., "Flexible Aluminum Coordination in Alumino-Silicates. Structure of Zeolite H-USY and Amorphous Silica-Alumina," The Journal of Physical Chemistry B 107(34), pp. 8854-8860 (2003).
O'Neill, et al., "Stabilization of Copper Catalysts for Liquid-Phase Reactions by Atomic Layer Deposition," Angewandte Chemie 125(51), pp. 14053-14057 (2013).
Pagan-Torres, et al., "Synthesis of Highly Ordered Hydrothermally Stable Mesoporous Niobia Catalysts by Atomic Layer Deposition," ACS Catalysis 1(10), pp. 1234-1245 (2011).

(56) References Cited

OTHER PUBLICATIONS

Parry, et al., "An infrared study of pyridine adsorbed on acidic solids. Characterization of surface acidity," Journal of Catalysis 2(5), pp. 371-379 (1963).

Pauly, et al., "Textural Mesoporosity and the Catalytic Activity of Mesoporous Molecular Sieves with Wormhole Framework Structures," Journal of the American Chemical Society 121(38), pp. 8835-8842 (1999).

Perdew & Wang, "Accurate and simple analytic representation of the electron-gas correlation energy," Physical Review B 45(23), pp. 244-249 (1992).

Poduval, et al., "Bronsted acid sites of zeolitic strength in amorphous silica-alumina," Chemical Communications 46, pp. 3466-3468 (2010).

Puurunen, "Surface chemistry of atomic layer deposition: A case study for the trimethylaluminum/water process," Journal of Applied Physics 97, 121301 (2005).

Rahtu & Ritala, "Reaction mechanism studies on titanium isopropoxide-water atomic layer deposition process," Chemical Vapor Deposition 8(1), pp. 21-28 (2002).

Roman-Leshkov, et al., "Phase Modifiers Promote Efficient Production of Hydroxymethylfurfural from Fructose," Science 312(5782), pp. 1933-1937 (2006).

Tanev & PInnavaia, et al., "A neutral templating route to mesoporous molecular sieves," Science 267(5199), pp. 865-867 (1995).

Trombetta, et al., "FT-IR studies on light olefin skeletal isomerization catalysis, III. Surface acidity and activity of amorphous and crystalline catalysts belonging to the SiO2—Al2O3 system," Journal of Catalysis 179(2), pp. 581-596 (1998).

Xu, et al., "Catalytic activity of Bronsted acid sites in zeolites: Intrinsic activity, rate-limiting step, and influence of the local structure of the acid sites," Journal of Catalysis 244(2), pp. 163-168 (2006).

Xu, et al., "Strong Bronsted Acidity in Amorphous Silica-Aluminas," The Journal of Physical Chemistry C 111(32), pp. 12075-12079 (2007).

Yang, et al,. "Synergy of Lewis and Br?nsted Acids on Catalytic Hydrothermal Decomposition of Hexose to Levulinic Acid," Energy Fuels 27(11), pp. 6973-6978 (2013).

Ylilammi, "Monolayer thickness in atomic layer deposition," Thin Solid Films 279(1-2), pp. 124-130 (1996).

Zhao, et al., "Triblock copolymer syntheses of mesoporous silica with periodic 50 to 300 angstrom pores," Science 279(5350), pp. 548-552 (1998).

\* cited by examiner

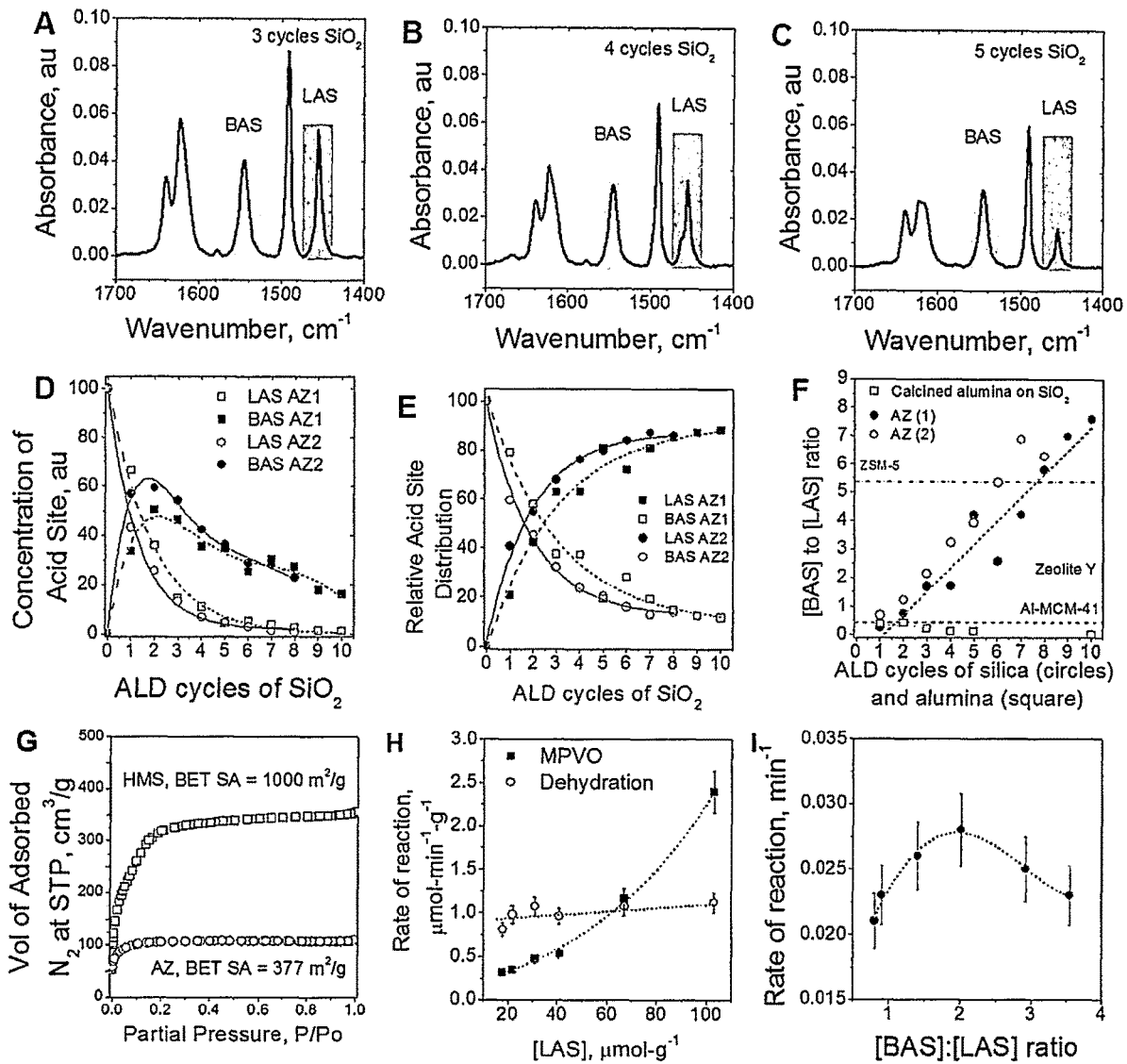
Figs. 2A-I

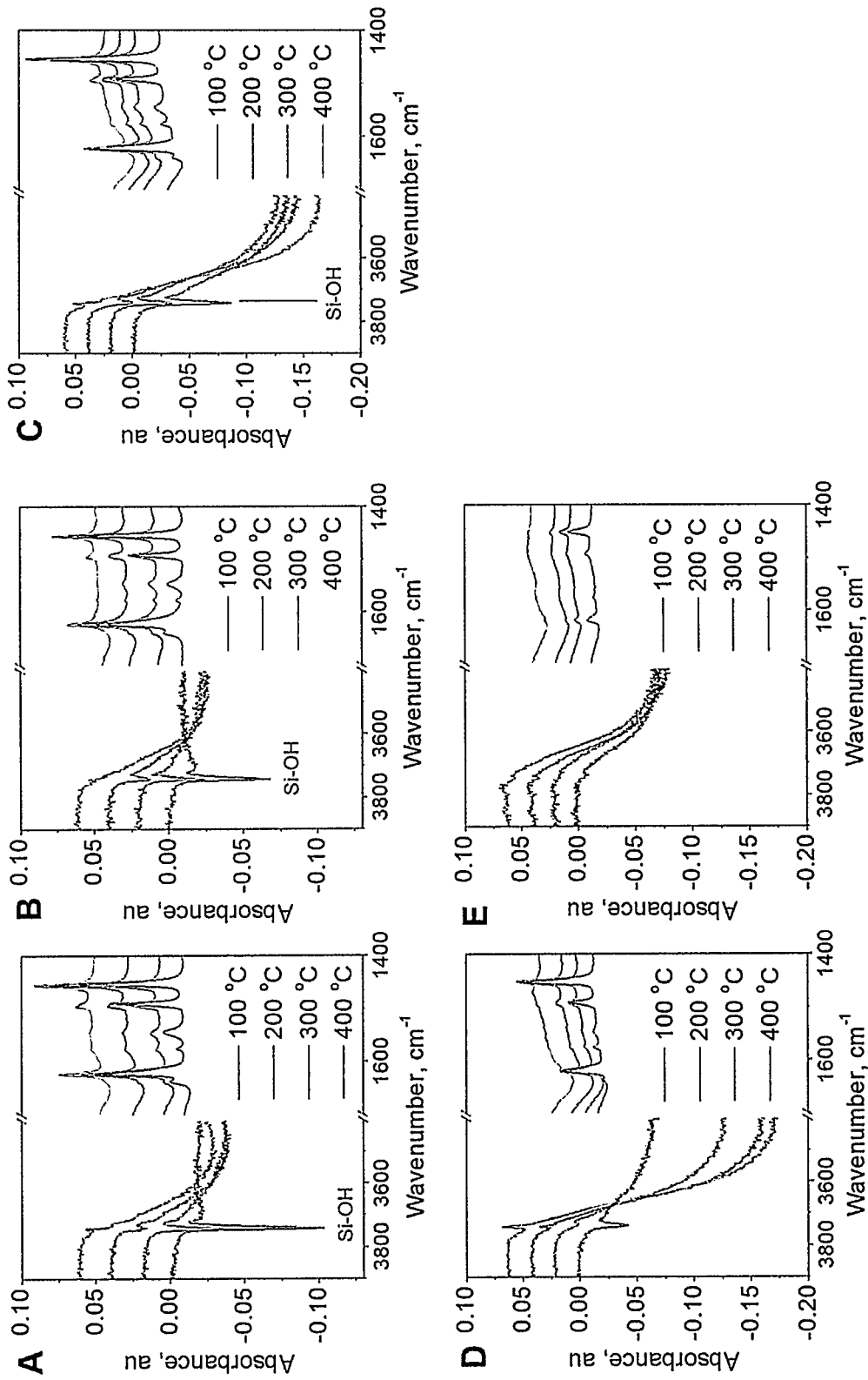
Figs. 10A-E

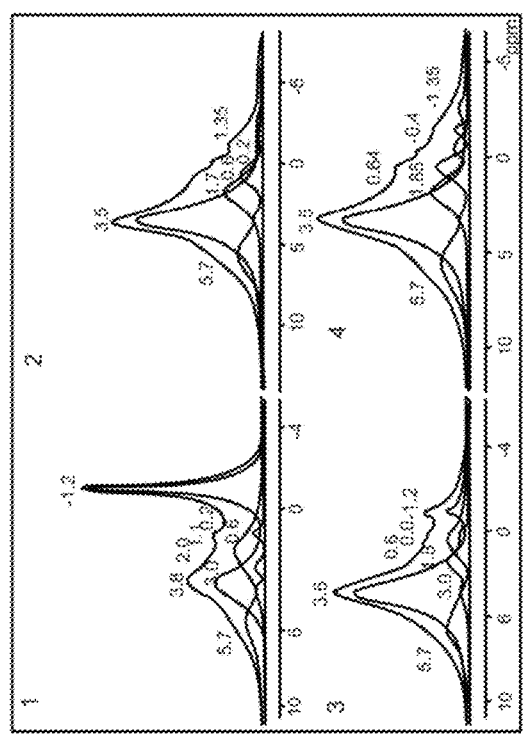
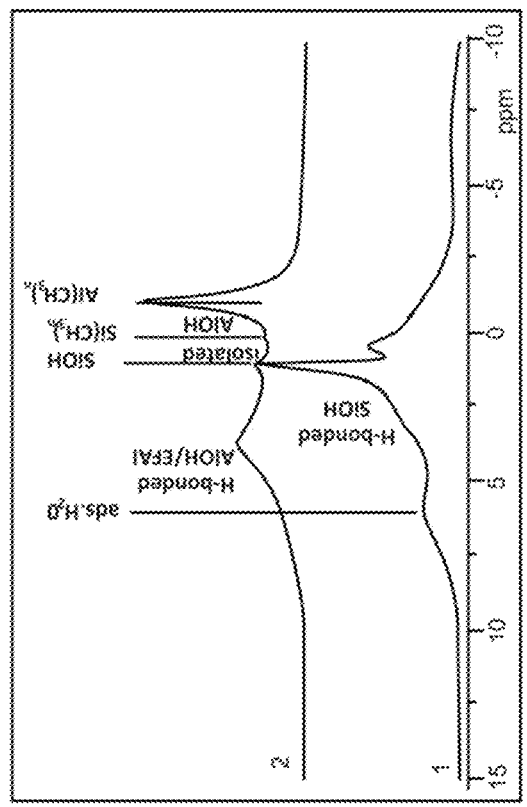
Figs. 11A-B

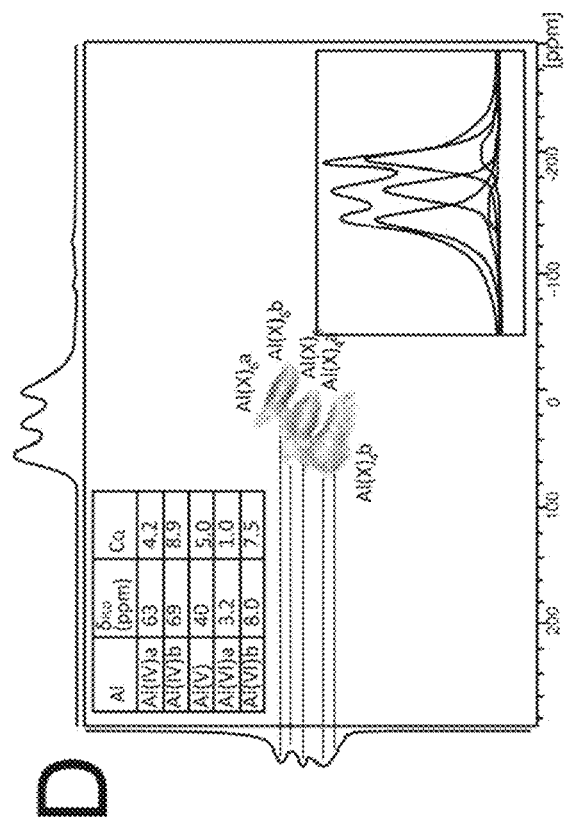
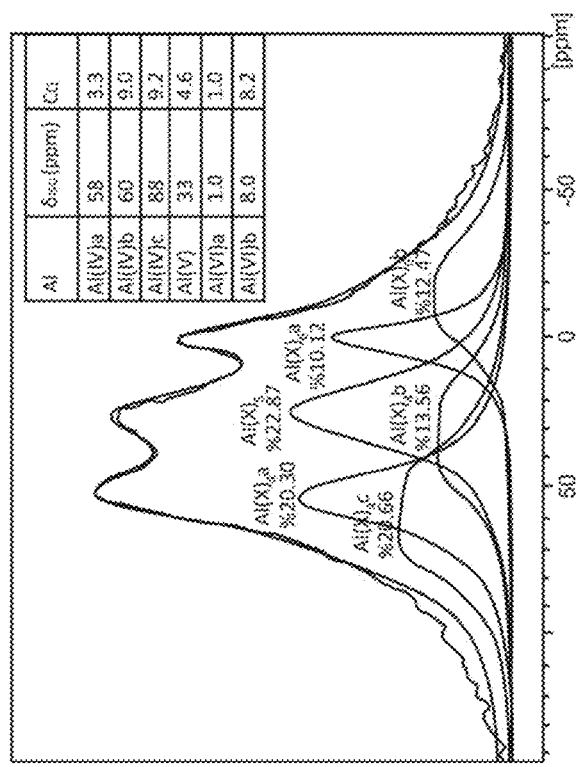
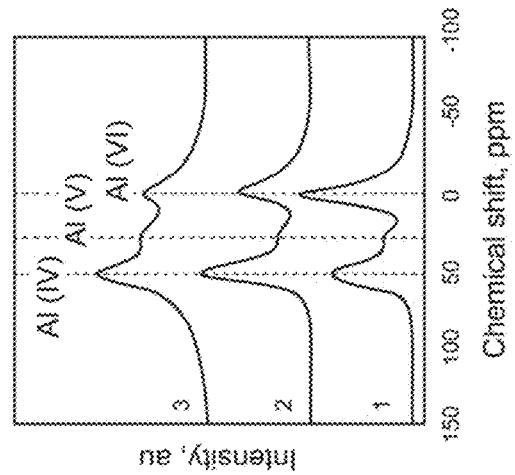
Figs. 11C-E

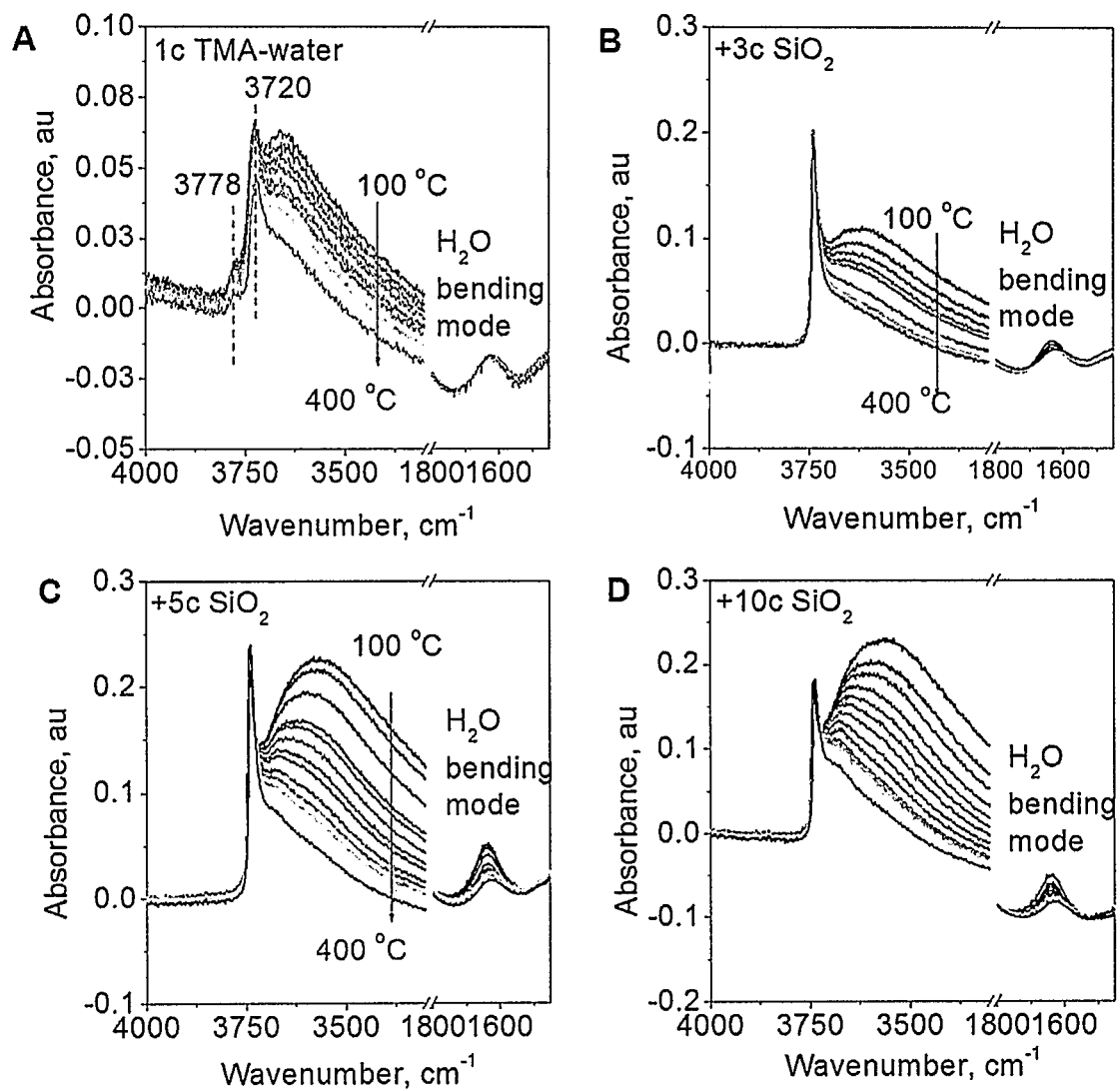
Figs. 12A-D

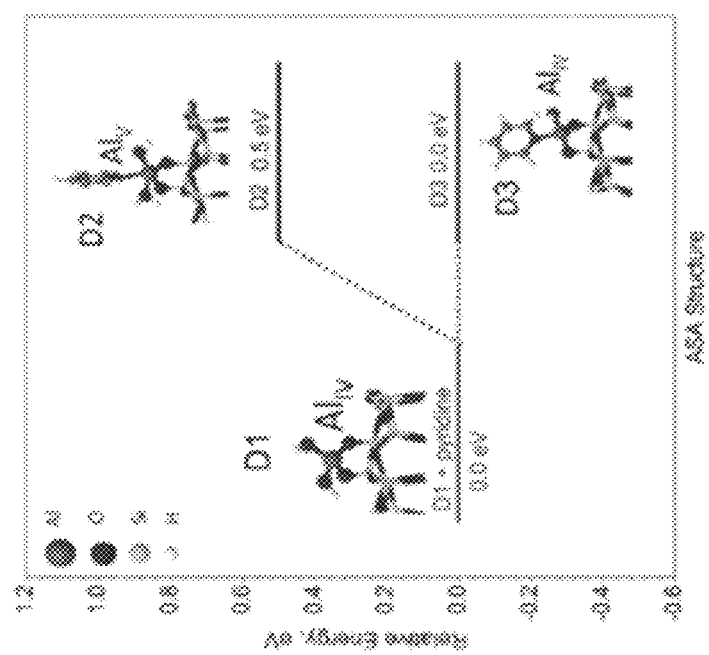
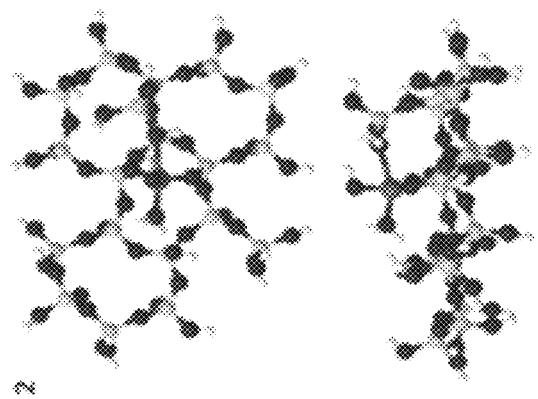
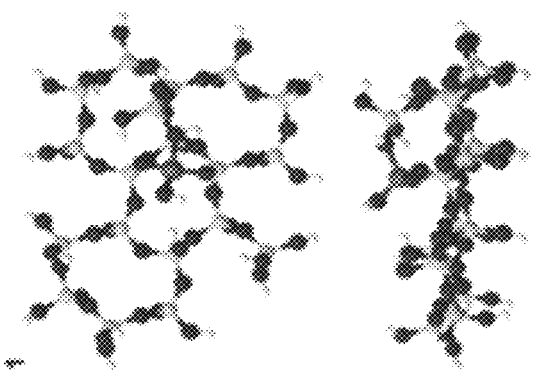
Figs. 13A-B

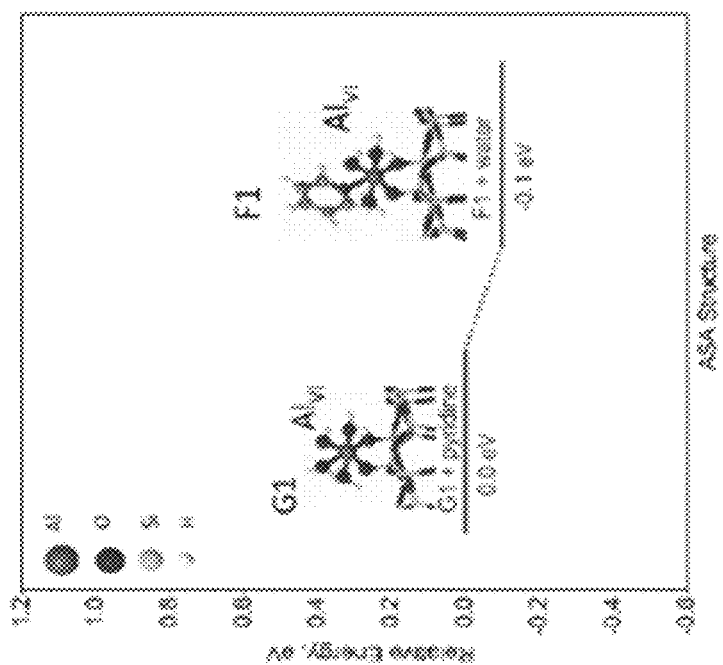
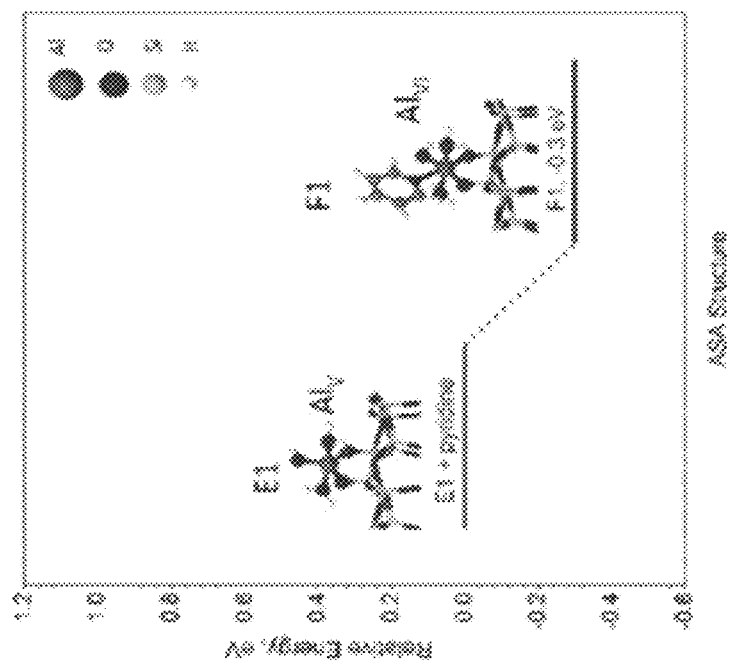
Figs. 13C-D

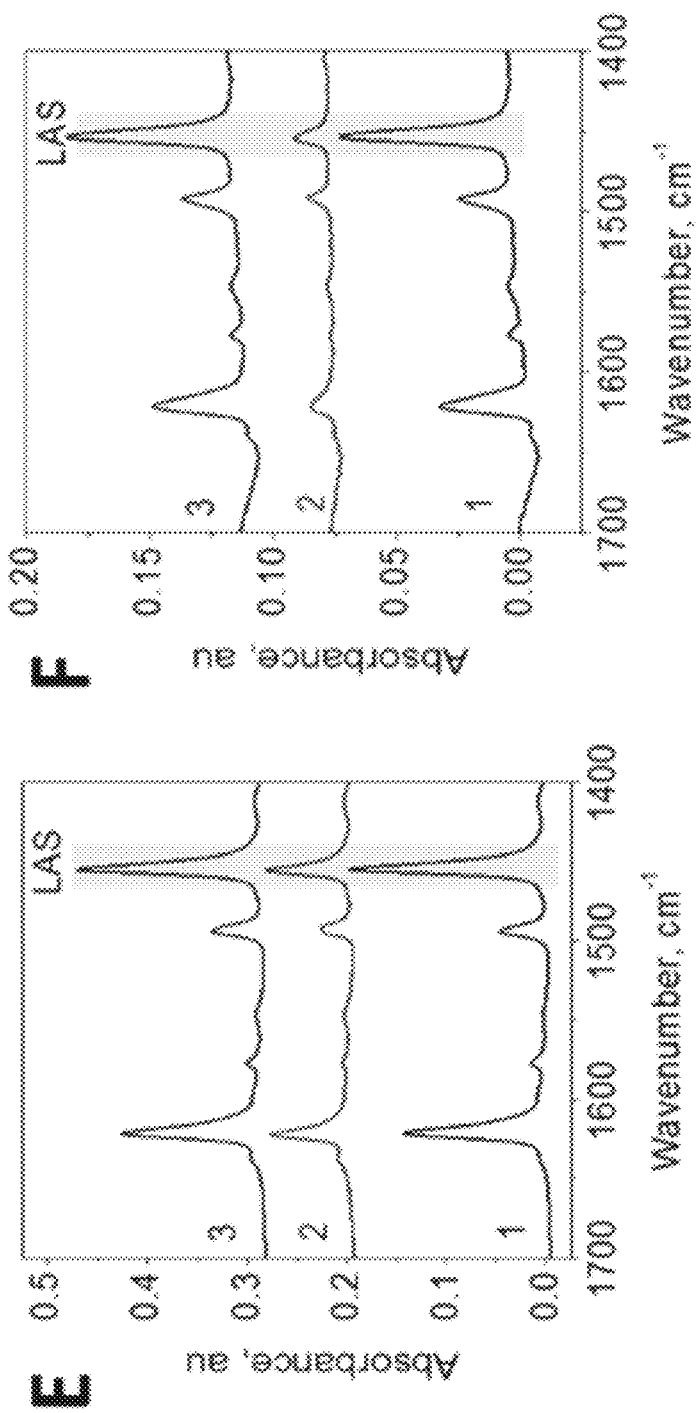
Figs. 13E-F

ARTIFICIAL ZEOLITES

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The present invention generally relates porous catalysts, specifically to artificial zeolites with independently tunable pores and acidity.

BACKGROUND OF THE INVENTION

Zeolites and amorphous silica-alumina (ASA) are the most ubiquitous solid acids, widely used as catalysts and supports in the petrochemical, fine chemical, and fuel industries. Acid sites on metal oxide surfaces can be either metal ions (Lewis acids) or hydroxyl groups (Bronsted acids). The strength of the acid in either case the strength of the acid site is dictated by how the metal is coordinated and the identity of the next nearest neighbor metal atoms. Typically, Zeolites are distinguished by their shape-selectivity, providing small pores that confine reagents to small space, and Bronsted acidity. In most zeolites the primary structural units consist of $AlO_4$ or $SiO_4$ tetrahedra, which form secondary units that may take the shape of simple polyhedra, such as cubes, hexagonal prisms or cubo-octahedra. The final framework structure for the zeolite consists of assemblages of these secondary units. More than 70 such framework structures are know, each with slightly different pore sizes. However, their intrinsically small pores, typically in the range 0.3 to 1.0 nm and pore volumes from about 0.10 to 0.35 $cm^3$/g See, Zeolites in Industrial Separation and Catalysis. Edited by Santi Kulprathipanja 2010 WILEY-VCH Verlag GmbH & Co. KGaA, Weinheim ISBN: 978-3-527-32505-4). These small pores impose diffusion limitations for larger molecules such as those relevant to biomass conversion. Zeolites have a crystalline structure, which controls the pore size. This same crystal structure also controls the acidity, thus linking pore size and acidity such that they are not independently controllable. This problem persists despite remedial efforts exploring delamination and the incorporation of mesoporosity. In contrast, ASA such as the Al-substituted mesostructured silica, have larger pores (2-50 nm) than natural zeolites. However, ASA exhibit milder Bronsted acidity than zeolites, believed to be due to the lower concentration of acid sites. The weaker Bronsted acidity of ASA inhibit the usefulness in many applications.

SUMMARY OF THE INVENTION

One embodiment of the invention relates to a method of increasing Bronsted acidity comprising: forming amorphous silica-alumina on a substrate; depositing a material having a silicon-oxygen species by atomic layer deposition; and forming a plurality of silanol functional groups on the amorphous silica-alumina substrate.

Another embodiment of the invention relates to a porous structure. The structure comprises an amorphous silica-alumina construct having a plurality of pores. A plurality of Bronsted acid sites are located on the amorphous silica-alumina. The amorphous silica alumina construct further comprises isolated metal sites within the plurality of pores, the isolated metal sites corresponding to Bronsted acid sites.

A method for tuning acidity of an amorphous silica-alumina having enhanced Bronsted acid activity, comprising: forming amorphous silica-alumina on a substrate; performing a cycle of atomic layer deposition, depositing a material; and converting a Lewis Acid Site to a Bronsted acid site.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 2A-C illustrate FTIR spectra after pyridine adsorption for AZ with FIG. 2A 1c TMA+3 cycle $SiO_2$, FIG. 2B 1c TMA+4 cycle $SiO_2$ and FIG. 2C 1c TMA+3 cycle $SiO_2$ showing different ratio of Bronsted and Lewis acid site peak; FIG. 2D shows evolution of LAS into BAS during $SiO_2$ ALD; FIG. 2E shows relative distribution of acidic species as function of silica cycle ALD; FIG. 2F shows the [BAS] to [LAS] ratio can be tailored from 0-8 using ALD while calcination of surface aluminated materials exhibit no control. ZSM-5, Zeolite Y and 3% Al-MCM-41 have ratios of 5.3, 1.9 and 0.4 respectively; FIG. 2G illustrates deposition of alumina and silica uniformly constricts the pores of a mesostructured silica to make AZ; FIG. 2H shows rates of MPVO and dehydration of fructose vs. LAS showing the dependence of the rate of MPVO on [LAS] while the rate of dehydration is unaffected by [LAS]; and FIG. 2I shows cascade catalysis of glucose to HMF showing an optimum BAS:LAS ratio of 2.

FIG. 6I, FIG. 6J, FIG. 6K, and FIG. 6L show difference FTIR spectra for growing: FIG. 6I aluminum oxide on silica showing the consumption of Si—OH on the initial TMA dose and the appearance of C—H stretches from Al—$CH_3$ where subsequent water dose produces Al—OH with the loss of the C—H stretch; FIG. 6J ASA via Pathway 1 showing similar behavior; FIG. 6K, Comparison for the C—H stretching peak for bare silica and materials with 1 cycle aluminum oxide during the trimethylsilanol step of the silica ALD; FIG. 6L Difference spectrum for the adsorption of pyridine on 1 cycle TMA-water on silica after heat treatment, where the material developed some BAS but the BAS is less than those materials with added silica ALD.

FIGS. 10A-E Difference FTIR spectra after pyridine adsorption-desorption on ex-situ calcined materials with FIG. 10A 1 cycle, FIG. 10B 2 cycles, FIG. 10C 3 cycles, FIG. 10D 5 cycles, FIG. 10E 10 cycles TMA-water on silica. Note the negative Si—OH peak with the appearance of BAS.

FIG. 11A $^1$H-MAS NMR of 1) pristine silica 2) silica with 1 cycle TMA; FIG. 11B shows deconvoluted $^1$H MAS NMR spectra of 1 cycle TMA-water (1) as-synthesized and (2) after calcination; and 1 cycle TMA+2 cycles silica ALD (3) as-synthesized and (4) after calcination; FIG. 11C show deconvoluted $^{27}$Al MAS NMR spectrum of 1 cycle TMA+3 cycle $SiO_2$ before pyridine adsorption. The inset table shows isotropic chemical shifts values ($\delta_{iso}$) and quadrupolar coupling constants ($C_Q$) for each aluminum resonance. Deconvolutions show total of % 54.5, 22.9 and %22.6 aluminum for 4-, 5- and 6-coordinate aluminum, respectively. FIG. 11D 2D $^{27}$Al MQMAS data for 1 cycle TMA+3 cycle $SiO_2$ after pyridine adsorption. The inset on the right corner is deconvoluted $^{27}$Al MAS NMR spectrum of 1 cycle TMA+3 cycle SiO2 after pyridine adsorption The inset table shows isotropic chemical shifts values ($\delta_{iso}$) and quadrupolar coupling constants ($C_Q$) for each aluminum resonance. Deconvolutions show total of % 44.8, 25.6 and %29.6 aluminum for 4-, 5- and 6-coordinate aluminum, respectively. FIG. 11E Solid state $^{27}$Al-NMR for (1) 1 cycle TMA-water, (2) 1 cycle TMA+2 cycle $SiO_2$ and (3) 1 cycle TMA+8 cycle $SiO_2$.

FIGS. 12A-12D show FTIR spectra (hydroxyl stretching region) for FIG. 12A 1 cycle TMA-water, FIG. 12B 1 cycle TMA+3 cycle $SiO_2$, FIG. 12C 1 cycle TMA+5 cycle $SiO_2$ and FIG. 12D 1 cycle TMA+10 cycle $SiO_2$ on MSU-F showing no bridging OH. All the materials show strongly bound water.

FIG. 13 (A) shows top and side views of cluster model representations of 1) A1 and 2) B2 structures in FIG. 4 used for frequency calculations. Candidate ASA structures after 1 cycle of TMA-water with FIG. 13B 4- FIG. 13C 5- and FIG. 13D 6-coordinate Al and pyridine adsorption energetics on these structures as LAS. FIGS. 13E-13F show FTIR studies for the ligand exchange of pyridine and water on FIG. 13E 1 cycle TMA-water and FIG. 13F ex-situ calcined 5 cycles TMA-water.

DETAILED DESCRIPTION OF THE PREFERRED EMBODIMENTS

Figures 1A, 1B:
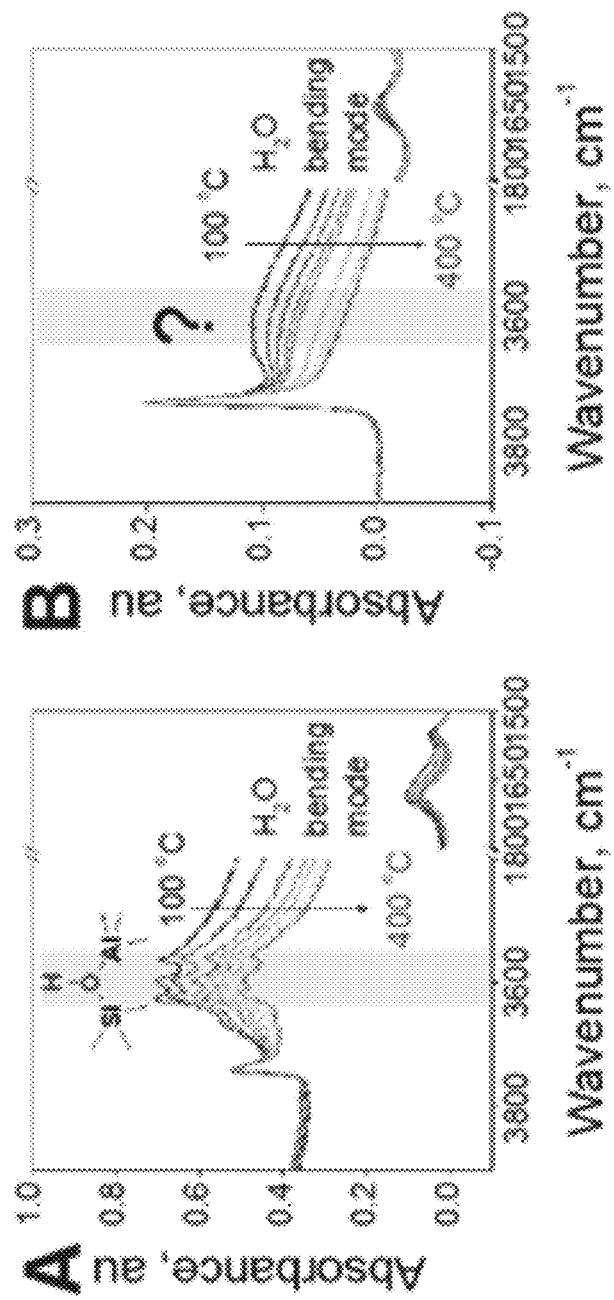
FIG. 1A illustrates Hydroxyl stretch of zeolite Y during in-situ dehydration from 100 to 400° C.
FIG. 1B illustrates Hydroxyl region for an AZ (1c TMA+3 cycles $SiO_2$) showing only terminal Si—OH.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Compositions of artificial zeolites are described herein that provide powerful Bronsted acidity with the high surface area, large-pore structure. In order to provide such a class of materials, there is need for a synthetic methodology and a more complete understanding of the Bronsted acid site (BAS) structures. For zeolites, the bridging hydroxyl (FIG. 1A) that is observed in the infrared is the widely accepted BAS. For ASA, convincing spectroscopic evidence of the bridging hydroxyl (despite some indication) is still lacking (FIG. 1B). This has led to a variety of different surface models for the BAS of ASA. The methods described provide for controlled acid speciation using ALD. This capability decouples geometry from surface chemistry, overcoming the fundamental limitation of natural zeolites wherein these traits are inextricably linked. Thus, systems and methods relating to tunable pore size in AZ are possible for a particular substrate, with acidity tailored to direct a specific transformation. Such materials would be industrially relevant, and would facilitate fundamental studies into structure-property relationships in catalysis. For example, the ability to tailor the pore size means being able to impose shape selectivity on ASA. Being able to create acid sites on any surface means that one can deconvolute geometry effects (confinement effect) from actual acidity. One example application is catalysis for biomass conversion since the molecules that must be converted are too large for the pores in traditional zeolites.

In one embodiment, the present invention relates to artificial zeolites and methods of creating same. In a particular method, an atomic layer deposition (ALD) technique is used to synthesize 'artificial' zeolites (AZ) which are ASA with precisely tailored Bronsted and Lewis acid ratio and arbitrary selectable pore size. Pore size, for example in the range of 0.5 nm to 1 cm, more preferably in the 2-50 nm range, and specifically in one embodiment >2 nm due to limitations of the ability of the precursor to diffuse. These AZ are built on mesostructured silica to take advantage of the high surface area. Additionally, the BAS for ASA is described. Thus, the methods herein provide a mesoporous ASA material with isolated metal sites that are BAS. Examples described below provide details of the synthesis and process characterization.

Figure 1C:
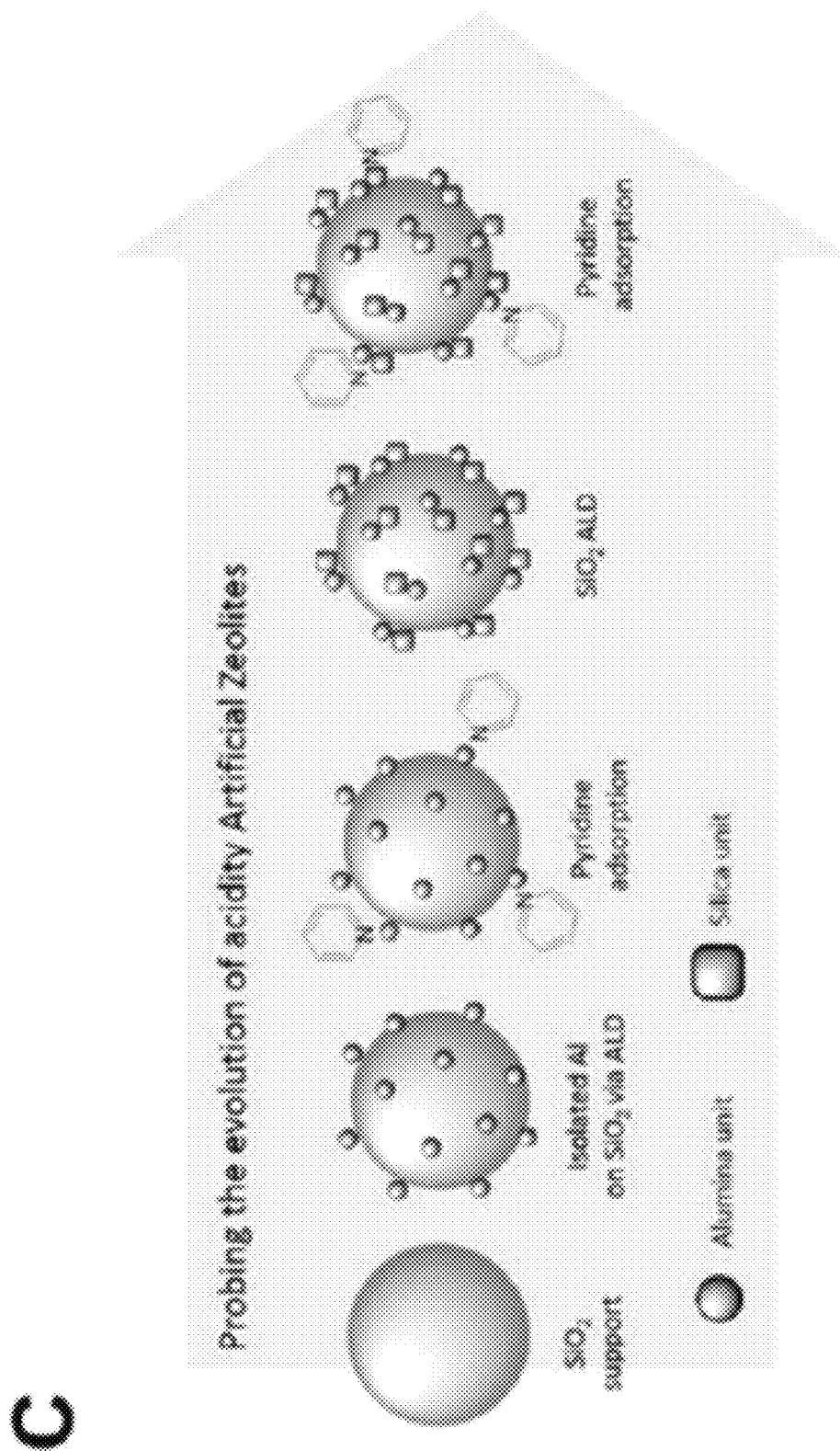
FIG. 1C illustrates Synthesis scheme for AZ using ALD and the probing of acidity. FTIR spectra after pyridine adsorption on FIG. 1D illustrates 1 cycle TMA-water on MSU-F.

Traditional liquid phase ASA synthesis yields weak BAS. Further, it provides only limited BAS tenability and leaves no opportunity to interrogate the silica-alumina structure at each condensation step. However, Atomic Layer Deposition (ALD) coupled with in-situ Fourier transform infrared absorption (FTIR) measurements provide a system for controlling each condensation step, monitoring the surface chemical transformations, and probing the surface acidity using pyridine (see, e.g., FIG. 1C). ALD plus FTIR also provides the benefit of allowing for identification and elimination of potential errors due to sample handling and preparation. Pyridine coordinated to Lewis acid sites (LAS) shows a characteristic peak at 1455 $cm^{-1}$ and its protonation on Bronsted acid sites (BAS) appears at 1545 $cm^{-1}$.

Figures 1D, 1E:
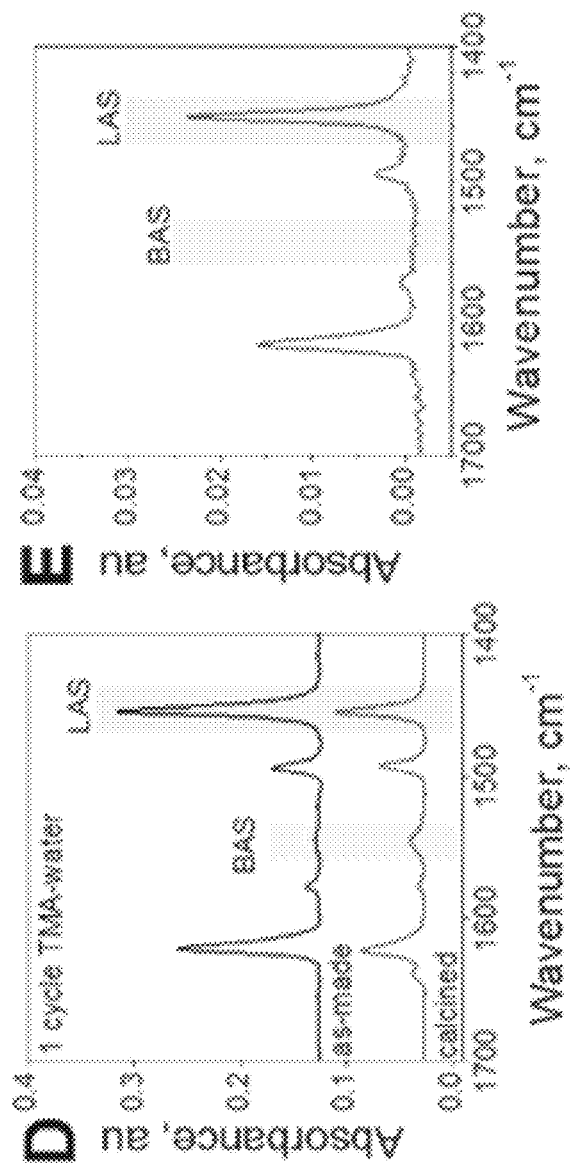
FIG. 1E illustrates isolated silica on aluminum oxide surface showing no BAS.

Initially, what serves as BAS in ASA was investigated. The prevalent notion regarding ASA is that the mild Bronsted acidity of ASA arises from the Si—O—Al interface, similar to zeolites. Therefore, a silica surface (MSU-F, 550 $m^2/g$) was decorated with isolated Al sites using 1 cycle of alumina ALD. Surprisingly, FTIR revealed exclusively LAS (FIG. 1D). Moreover, increasing the number of alumina ALD cycles did not produce BAS (FIG. 5B), indicating that the Si—O—Al interface alone does not lead to BAS (See FIGS. 13B-13D). Reversing the interface by decorating a continuous alumina surface with isolated silica (FIG. 1E) also did not yield BAS. Ex-situ calcination of 1 cycle alumina ALD on silica at 550° C. in air generated a weak BAS signal, characteristic of traditional ASA (FIG. 1D and FIG. 5C), but provided no control over acid speciation. However, when ALD silica was added to the purely Lewis acidic Al sites formed by alumina ALD, BAS sites emerged (FIG. 2A to 2C). Quantification of the BAS and LAS peaks revealed a systematic and monotonic decrease in LAS with each ALD silica cycle (FIG. 2D), whereas the BAS reached a maximum at 2-3 silica cycles and decreased thereafter, most likely through condensation of BAS with additional silica (See FIG. 6K). Nevertheless, the BAS dominate after 3 cycles of silica ALD (FIG. 2E) and the BAS-LAS ratio is tunable over a remarkably broad range spanning and exceeding traditional zeolites and ASA (FIG. 2F) In one embodiment, the tunability is from 0-8. For zeolites, this is usually done by varying the hydrothermal synthesis composition. Another approach used on zeolites is through steaming which dislodges the Al from the framework to become extra-framework Al. This steaming process decreases the BAS and increases the LAS. However, steaming does not provide purposeful/precise control Thus, certain embodiments provide the ability to tailor the BAS and LAS on ASA using the described method. The prior art fails to provide such a technique that demonstrates such precise control. Moreover, the conformal coverage of ALD enables the creation of BAS and LAS on virtually any silica host, including mesostructured silica where the pores can be first constricted to a desired size via ALD. In one example, the framework pore diameter of a super-microporous HMS wormhole silica was decreased to the point it approached zeolitic pore size. This example utilized 1 cycle alumina ALD and 2 cycles silica ALD. The surface area decreased from 1000 $m^2/g$ to 377 $m^2/g$, and the nitrogen saturation behavior at low partial pressure is characteristic of microporous zeolites (FIG. 2G). Most importantly, $NH_3$ temperature programmed desorption for this AZ material yielded an acid site concentration of 300 μmol/g, on par with traditional zeolites.

In one embodiment, a method is provided for synthesizing an AZ. A porous template is selected to achieve a desired pore size. For example, for zeolites the 0.3-1.0 nanometer pore size is achieve by using structure directing agent (SDA) such as quaternary ammonium salt. The size of the SDA determine the size of the pores. For mesoporous silica, the SDA are supramolecular assemblies such as surfactants and polymers. However, the smallest size of these assemblies (e.g. micelles) are typically >2 nm. Thus, in one embodiment, the gap of 1-2 nm pore size can be addressed through the described method. For example, ALD can be used to start with a 2 nm pore and constrict it to <2 nm The porous template may be an amorphous silica substrate such as a hydrogel produced by known mechanisms. A first stage provides porosity control within a porous material. The first stage involves the creation of a porous material using the porous template by depositing material, such as a metallic material, onto the porous template. The porous composition, such as amorphous silica-alumina, may have a tunable porosity. It should be appreciated that the deposition method, such as ALD provides tenability by conformally growing the film on all inner pore surfaces, thus shrinking the pore diameter with each ALD cycleIn one example, alumina is deposited via ALD onto the amorphous silica. At this stage, the alumina deposited porous template consists of predominately Lewis acid sites.

In a second stage, acidity of the porous composition, for example the amorphous silica-alumina, is altered. The ratio of LAS to BAS is changed, such as by increasing the number of BAS by converting LAS to BAS. Silicon dioxide is then deposited by ALD to convert the Lewis acid sites into Bronsted acid sites. It is believed that other metal oxides may be used to achieve similar results of increased BAS. For the most of the examples used herein, 1 cycle $Al_2O_3$ was followed by Y cycles $SiO_2$. However, in other embodiments more generally there are X cycles of A followed by Y cycles of B wherein A=$Al_2O_3$, $TiO_2$, MgO, or $Nb_2O_5$ and Y is a metal oxide. The deposition of silicon dioxide can be selected to achieve a desired ratio of Lewis acid sites to Bronsted acid sites. For example, the number of $SiO_2$ ALD cycles determines the BAS/LAS and pore size In one embodiment, the acidity control stage introduces isolated metal, such as Al(III), through ALD into the porous compound to alter the acidity and form the AZ. The isolated metal sites are created by a single cycle of ALD rather than multiple cycles. Further, the use of fewer cycles prevent the ALD from filing the pores, essentially blocking them. Isolated metal sites mimic the single metal site found in many enzymes such as the Mg in chlorophyll and Fe in hemoglobin.

Further, in one embodiment, one or more $TMA/H_2O$ cycles are followed by one or more $TMSiOH/O_3$ cycles. This technique yields a combination of Bronsted acid and Lewis acid sites, where the relative amounts can be tuned precisely to produce zeolite-like Bronsted acid sites.

In one embodiment, the porous material is selected, as well as the method of making it, for compatibility with the characterization techniques and stages described herein. For example, in one embodiment, trimethylsilanol-$O_3$ is used to deposit silica. Low temperature silica ALD (atomic layer deposition) processes reported thus far are not suitable due to poor interaction with the characterization process. For instance, $SiCl_4/H_2O$ generates HCl byproduct that can strongly adsorb to yield a false positive BAS signal. Similarly, catalyzed silica ALD would obfuscate the FTIR measurements. It is believed that in some applications, the plasma in a plasma-assisted $SiO_2$ ALD method would prevent uniform coating of the high surface area silica powder. Atomic layer epitaxy (ALE) also has been done using hexadimethylsilazane but the presence of nitrogen by-product can potentially poison Lewis or Bronsted acidic sites. Finally, rapid $SiO_2$ ALD yields ~1 nm/cycle, and does not allow the silica coverage to be tuned precisely.

Characterization

Importantly, because of the methods described herein provide the capability to precisely control acid speciation, whether a given transformation is Bronsted or Lewis acid catalyzed becomes an viable consideration to allow optimization. A series of MSU-F based AZ materials were synthesized via ALD with varying BAS:LAS ratio. These materials were tested for reduction of cyclohexanone to cyclohexanol via the Meerwein-Ponndorf-Verley-Oppenauer (MPVO) reaction that is Lewis acid catalyzed. The materials were also tested for fructose dehydration to 5-hydroxymethylfurfural (HMF) which is Bronsted acid catalyzed. Although ASA materials are not optimal catalysts for these transformations, these reactions are sufficiently catalyzed to provide for proof of concept. FIG. 2H reveals that the rate of MPVO scales with the LAS while the dehydration reaction does not, thus confirming that the MPVO reaction is indeed Lewis acid catalyzed. Next, the cooperativity between Lewis and Bronsted sites on AZ was investigated as bifunctional catalysts using the cascade reaction for glucose to HMF. This transformation involves both LAS and BAS catalyzed steps. The isomerization of glucose to fructose is LAS-catalyzed via the MPVO mechanism and the subsequent dehydration of fructose to HMF is BAS-catalyzed. FIG. 2I shows that the optimum ratio, for this reaction, for Bronsted to Lewis sites is about 2, consistent with previous reports using homogeneous catalysts. It should be appreciated that one can use a catalyst (bifunctional) for two reactions and that will reduce the steps and energy input for a process. (i.e. one reactor instead of two reactors for the two steps)

Having developed a method for precise synthetic control over acid speciation, attention can be turned to determining the BAS structure in ASA. In natural zeolites, pyridine adsorption consumes the bridging hydroxyl as illustrated by the difference FTIR spectra in FIGS. 3A to 3B. This is solid evidence that the bridging hydroxyls are indeed the BAS for zeolites.

Figures 3A, 3B, 3C, 3D, 3E, 3F, 3G:
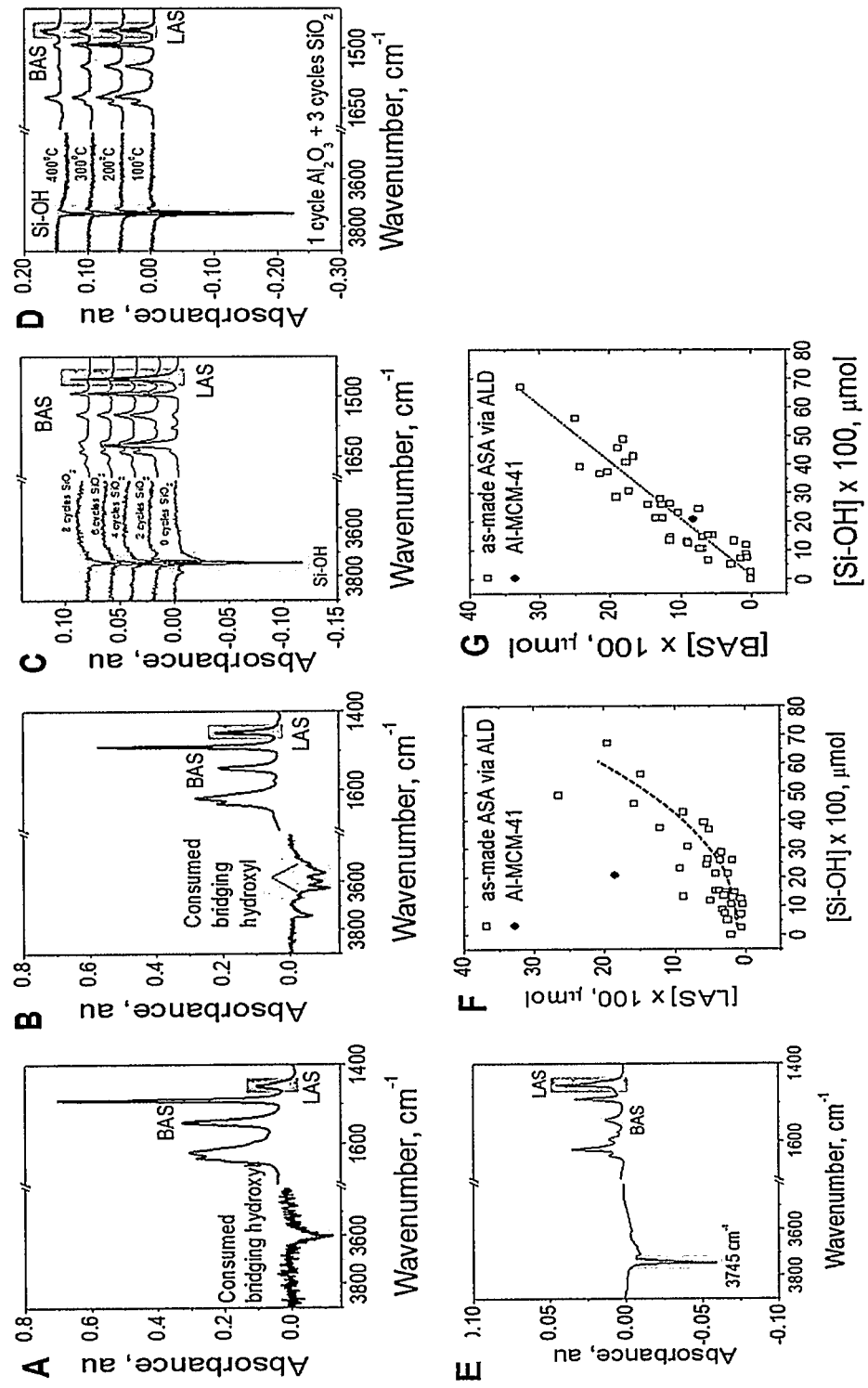
FIGS. 3A-B show difference FTIR spectra during the adsorption of pyridine on FIG. 3A ZSM-5 and FIG. 3B zeolite Y showing the consumption of bridging OH.
FIG. 3C shows representative AZ showing the conclusively consumed species is only Si—OH.
FIG. 3D illustrates temperature programmed desorption of pyridine from AZ (1c TMA+3 cycle $SiO_2$) showing the restoration of Si—OH as pyridine desorbed.
FIG. 3E illustrates pyridine adsorption of Al-MCM-41 also shows Si—OH consumption suggesting that the BAS are similar to AZ.
FIG. 3F shows [LAS] vs [Si—OH] and FIG. 3G [BAS] vs [Si—OH]plots for amorphous silica-alumina ("ASA") materials made via ALD showing a non-linear correlation for the former and a linear correlation for the latter, where [BAS] for Al-MCM-41 trends well the AZ results.
Figures 7A, 7B, 7C:
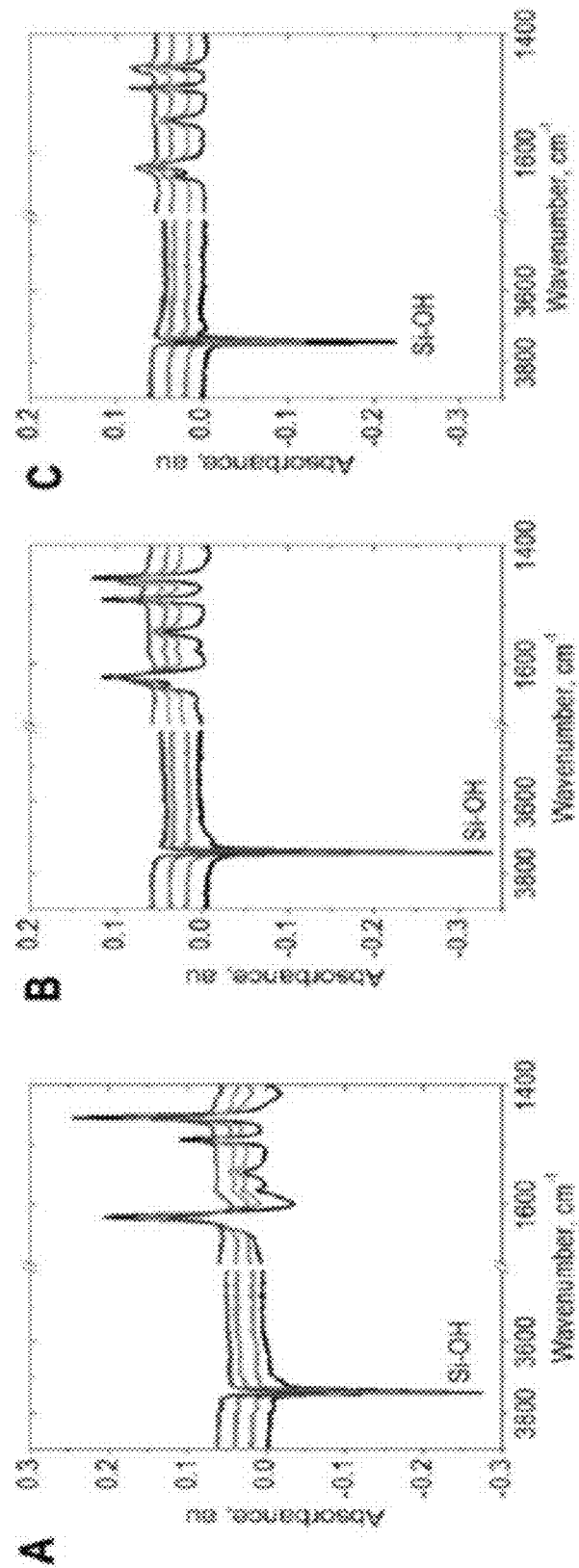
FIGS. 7A-J show difference FTIR spectra after pyridine adsorption-desorption on materials (Pathway 1) with 1 cycle TMA followed by FIG. 7A 1 cycle, FIG. 7B 2 cycles, FIG. 7C 3 cycles, FIG. 7D 4 cycles, FIG. 7E 5 cycles, FIG. 7F 6 cycles, FIG. 7G 7 cycles, FIG. 7H 8 cycles, FIG. 7I 9 cycles, FIG. 7J 10 cycles silica. ALD of TMA was done at 100° C. The ALD of silica was done using TMSiOH-ozone. Note the negative Si—OH peak with the appearance of BAS. Spectrum in black, red, blue and green are taken after thermal treatment at 100, 200, 300 and 400° C. respectively.
Figures 7D, 7E, 7F:
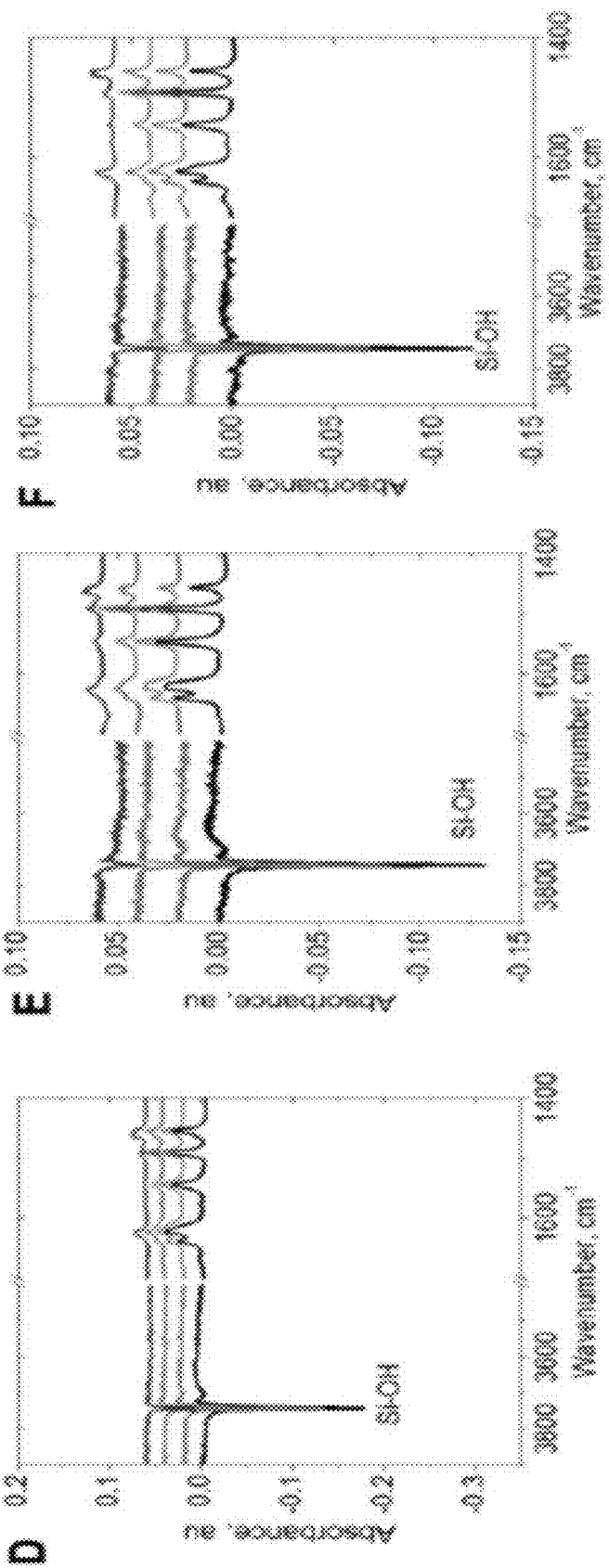
Figures 7G, 7H, 7I, 7J:
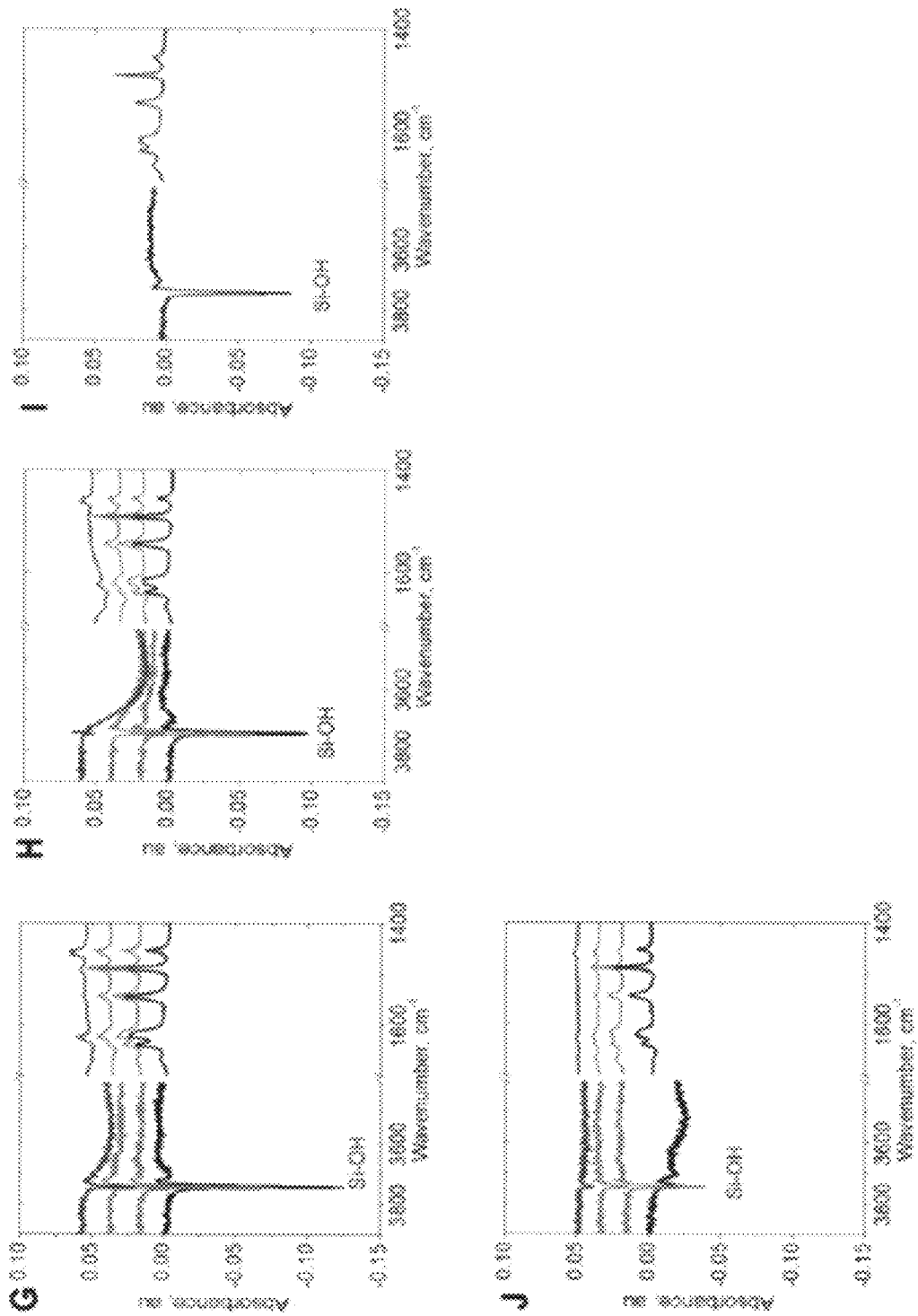
Figures 8A, 8B, 8C:
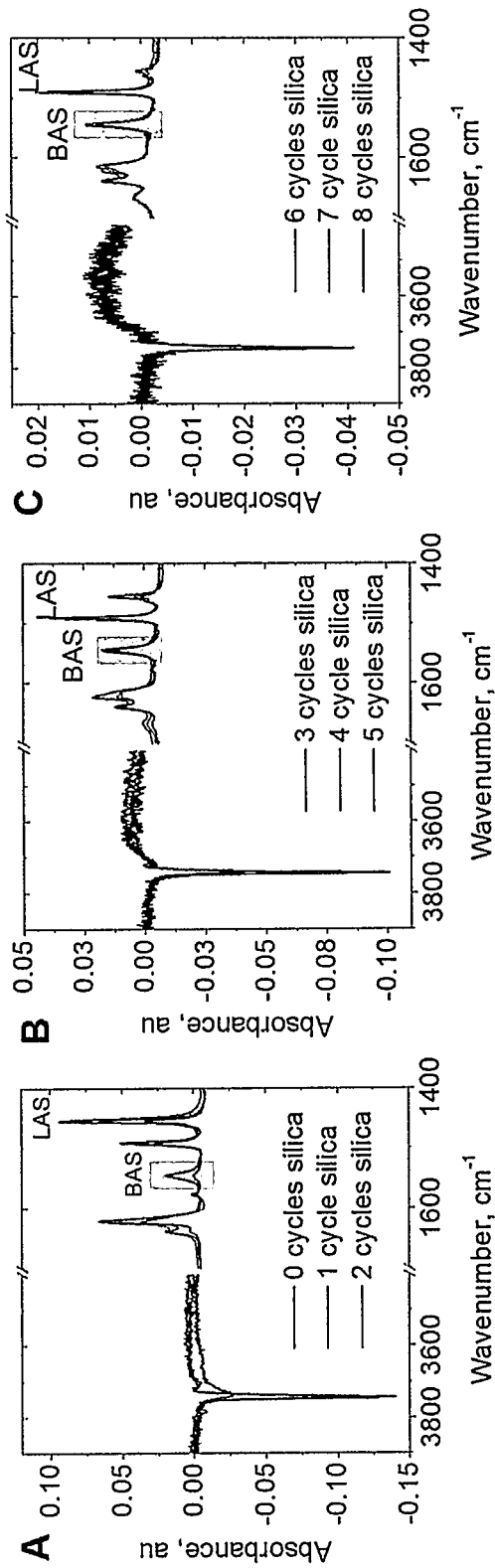
FIGS. 8A-C show difference FTIR spectra after pyridine adsorption-desorption on materials (Pathway 2) with 1 cycle TMA-water followed by FIG. 8A 0-2 cycle, FIG. 8B 3-5 cycles, FIG. 8C 6-8 cycles silica. Note the negative Si—OH peak with the appearance of BAS.
Figures 9A, 9B, 9C, 9D, 9E, 9F:
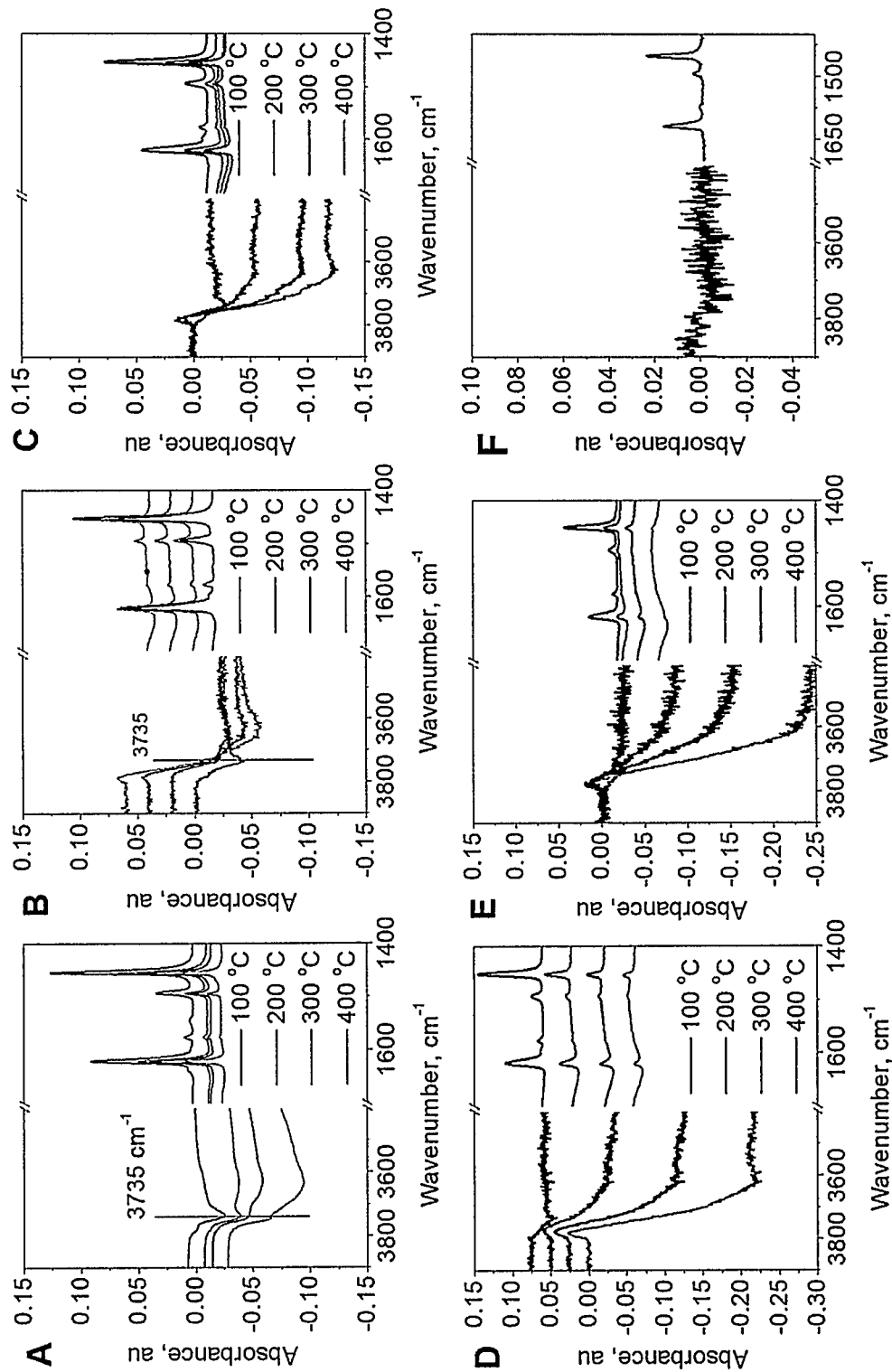
FIGS. 9A-E show difference FTIR spectra after pyridine adsorption-desorption on materials with FIG. 9A 1 cycle, FIG. 9B 2 cycles, FIG. 9C 3 cycles, FIG. 9D 5 cycles, FIG. 9E 10 cycles TMA-water on silica deposited in-situ. ALD of TMA-water was done at 100° C. The broad negative OH peak appearing at higher temperature is due to the desorption of water that is left on the surface after the water dose step of the ALD. Note the lack of negative terminal Si—OH peak during pyridine adsorption.

Experimental observations indicate that in ASA silanols are consumed during pyridine adsorption (FIG. 3C, FIGS. 7 and 8). Furthermore, in-situ heating from 100 to 400° C. desorbed the pyridine and restored the consumed silanol as the BAS peak disappears (FIG. 3D). Materials that did not exhibit BAS, such as 1 cycle alumina on silica (FIG. 1D and FIG. 9) and isolated silica on alumina (FIG. 1E and FIG. S9F), did not show consumption of silanols. However, the 1 cycle alumina material that developed BAS after calcination also began exhibiting silanol consumption (FIG. S6A). Pyridine adsorption on the traditional ASA, Al-MCM-41 (Sigma-Aldrich), also showed silanol consumption (FIG. 3E) indicating that the BAS structure for AZ is shared by traditional ASA. Correlating the [Si—OH] vs. [LAS] showed no clear linear trend (FIG. 3F) whereas the [Si—OH] vs. [BAS] shows a linear correlation and matches the data for Al-MCM-41 (FIG. 3G). Thus, the FTIR evidence unanimously implicates silanols in the BAS structure for AZ and ASA.

However, silica has silanols, but does not protonate pyridine. To elucidate the structure and mechanism for ASA, MAS-NMR and FTIR measurements were combined with DFT calculations. Silanols from purely siliceous materials do not exhibit the Bronsted acidity of ASA, thus the mechanism must involve surface Al. In experiments, solid state $^{27}Al$-NMR always yielded 4-, 5-, and 6-coordinate species (FIG. 11E). Extensive dehydration of the ASA and AZ materials showed only terminal silanols and no conclusive evidence of bridging hydroxyls, even for materials exhibiting strong BAS peaks (FIG. 12B to 12D). However, strongly bound water was observed for these materials.

Figures 4A, 4B, 4C, 4D:
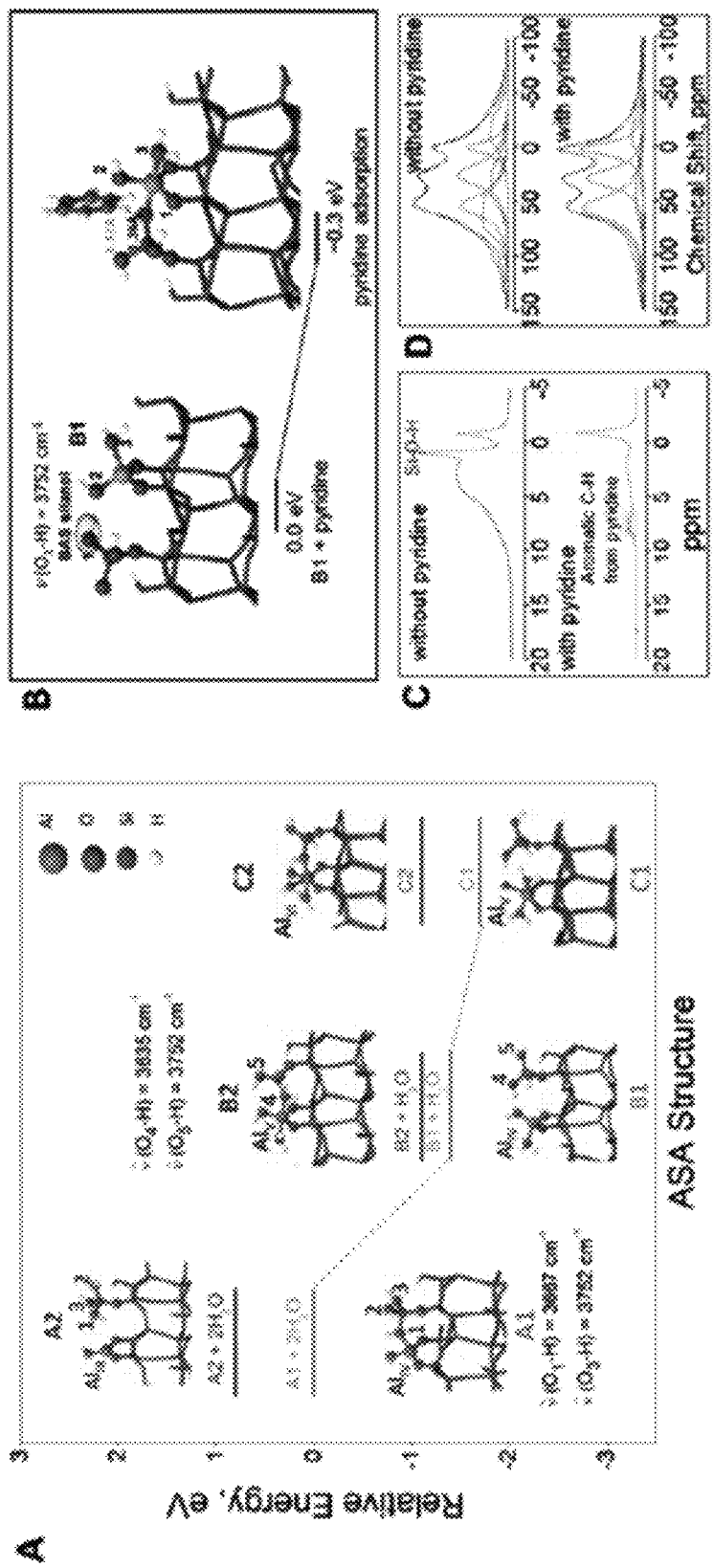
FIG. 4A is an energy profile for possible ASA structures for Al centers with 3, 4, and 5 coordination.
FIG. 4B shows deprotonation mechanism of Bronsted acidic silanol near an Al(IV)
FIG. 4C shows $^1$H-NMR for 1 cycle TMA+3 cycle $SiO_2$ showing the consumption of silanol proton after pyridine adsorption.
FIG. 4D illustrates corresponding $^{27}$Al-NMR spectra before and after pyridine adsorption showing a net −10% decrease in Al(IV), +3% increase in Al(V) and a +7% increase in Al(VI)

DFT was employed to calculate plausible BAS surface structures consistent with the NMR and FTIR results (FIG. 4A). Of the 6 candidates, A2 is energetically unfavorable and should relax to A1, while A1, B2, and C2 incorporate bridging hydroxyls that contradict the FTIR. However, structures B1 and C1 are energetically favorable and consistent with the data. B1 is a four-coordinate Al bound with one water molecule and C1 is 5-coordinate Al with 2 water molecules, both near silanols. The neutrality of water causes no charge imbalance and thus requires no bridging hydroxyl. The FTIR rules out possible dative bonding between the silanol and Al, as this would reduce the Si—OH stretching frequency (3635 cm$^{-1}$ by DFT). FIG. 4B shows the proposed model for the BAS structure and mechanism. The Bronsted acidic silanols are spectroscopically indistinguishable from ordinary silanols since their stretching frequencies are identical (3752 cm$^{-1}$ for B1). DFT shows that proton transfer from silanol to pyridine occurs only if the newly-formed Si—O species is stabilized by bridging with a nearby Al, effectively increasing the Al coordination by +1.

Figure 4E:
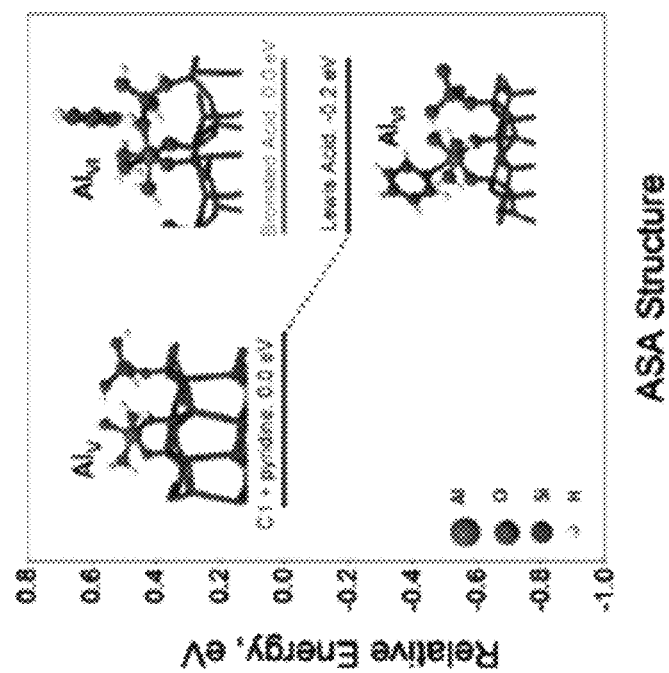
FIG. 4E is the energy profile for Al(IV) and FIG. 4F for Al(V) acting as a Lewis and Bronsted acid.

To test this model, an AZ was synthesized using 1 cycle alumina and 3 cycles silica and examined by NMR before and after pyridine adsorption. $^1$H-NMR results confirmed the consumption of silanol protons after pyridine adsorption (FIG. 4C). Moreover, $^{27}$Al-NMR (FIG. 4D) revealed that pyridine adsorption changed the relative populations of 4-, 5-, and 6-coordinated Al from initial values of 54.5, 22.9, and 22.6%, to become 44.8, 25.6, and 29.6%, respectively. This suggests Al conversion from 4- to 6-coordinate, a change of +2 in apparent contradiction to our model. However, subsequent DFT calculations revealed that B1 is more stable as a BAS (FIG. 4E) and C1 is stabilized as a LAS (FIG. 4F), suggesting cooperativity. Consequently, the 10% change from 4- to 5-coordinate in the $^{27}$Al-NMR is due to BAS, and the 7% change from 5- to 6-coordinate is due to LAS. This yields a relative acid distribution of 41% LAS and 59% BAS in excellent agreement with the FTIR (60% BAS and 40% LAS, FIG. 2E).

Thus, FTIR, NMR and DFT unanimously demonstrate that the origin of Bronsted acidity for AZ are silanol groups adjacent to 4-coordinate Al centers and not bridging hydroxyls. It is believed that this is general to all ASA, since the Al-MCM-41 also exhibited silanol consumption upon pyridine protonation.

In-Situ QCM and QMS Studies and Lab-Scale Synthesis of ASA

Figure 5A:
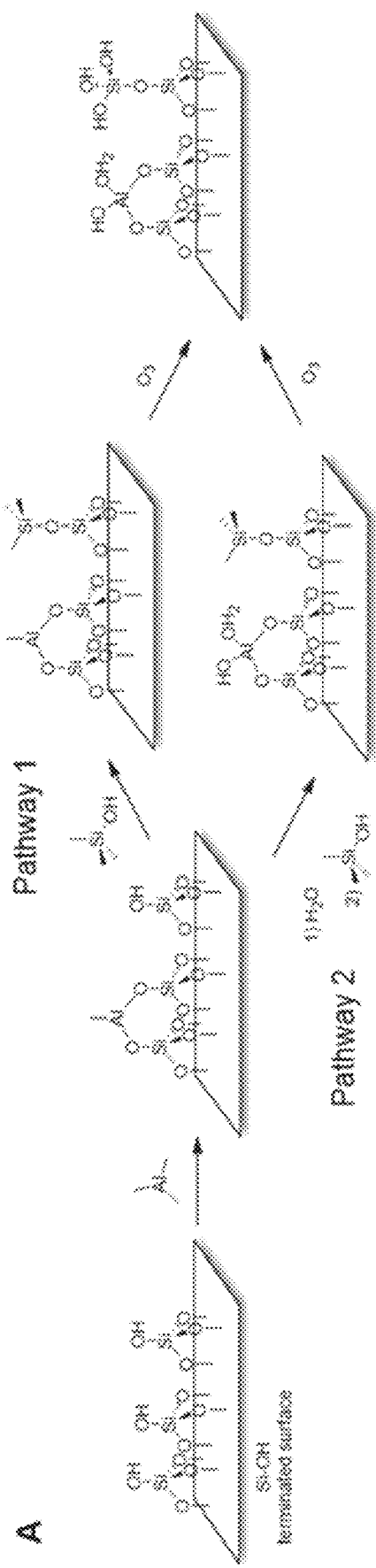
FIG. 5A is a synthesis scheme for artificial zeolite using ALD.
Figure 5B:
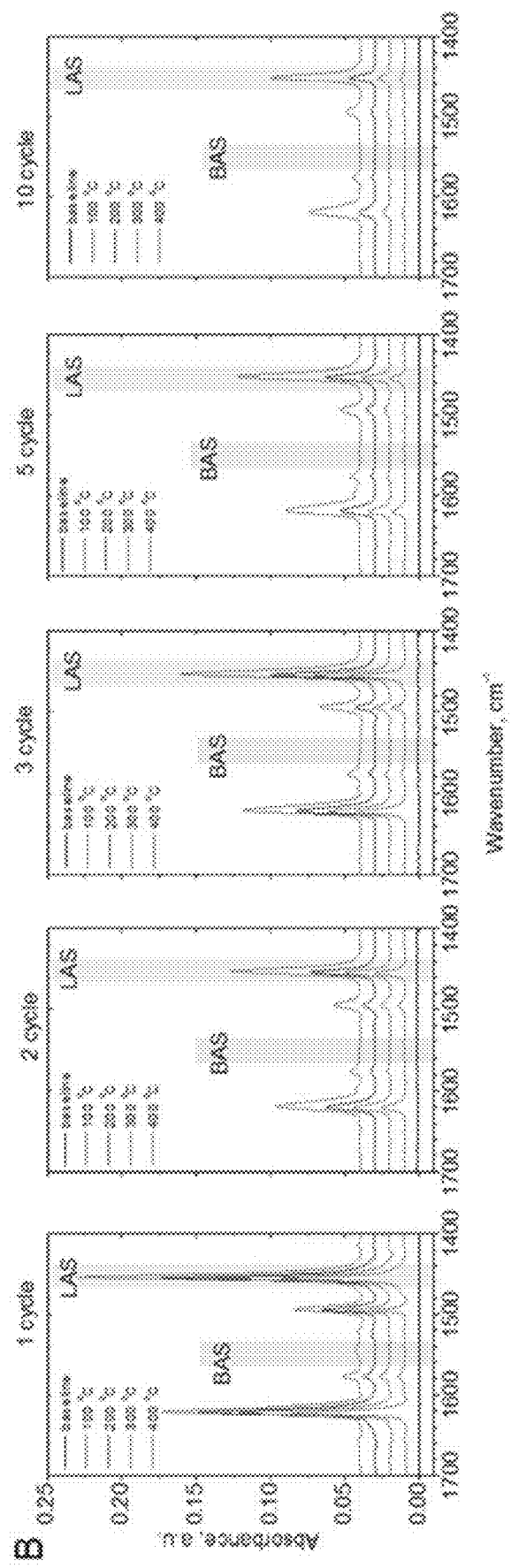
FIG. 5B shows difference FTIR spectra for (B) as-synthesized ASA with 1, 2, 3, 5 and 10 cycles of TMA-water on silica after pyridine adsorption showing only LAS and the absence of BAS except for 1 cycle where there was a very small peak.
Figure 5C:
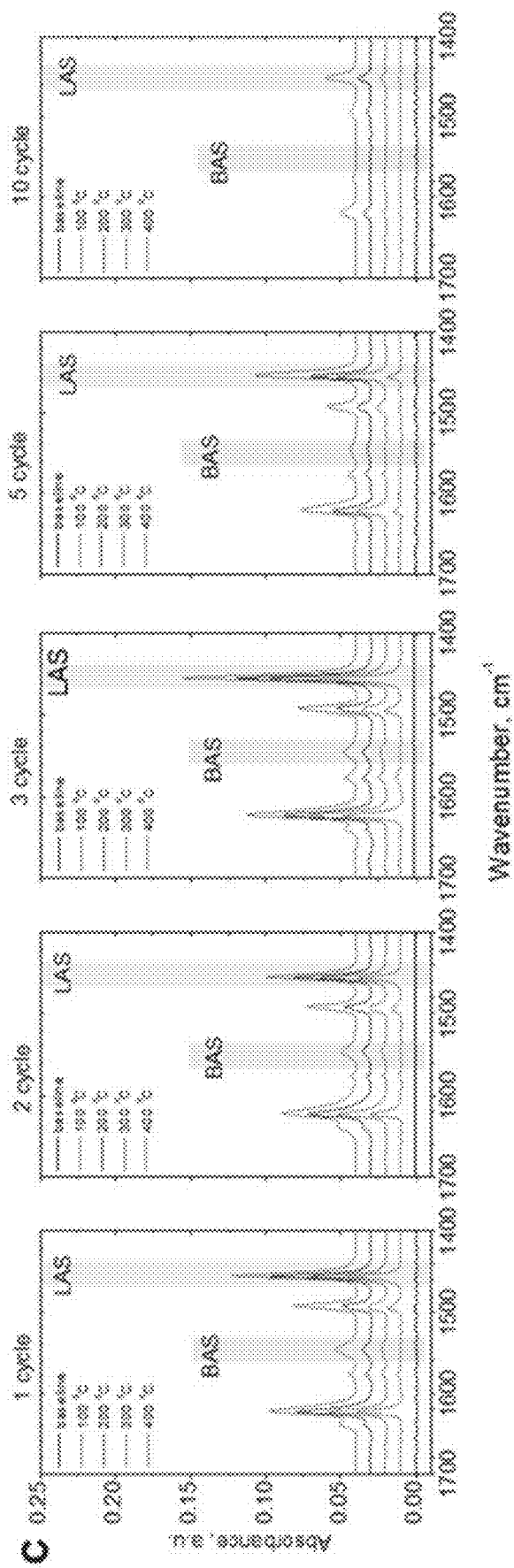
FIG. 5C shows 1, 2, 3, 5, and 10 cycles of TMA-water on silica after calcination (ex-situ) at 550° C. in air for 12 hours showing the development of BAS except for 10 cycle material where thermal treatment of the samples at 200, 300 and 400° C. partially desorbed the pyridine to provide insight on the relative strength of the acid sites.

A tubular viscous flow reactor with an inside diameter of 5 cm equipped with a QCM (quartz crystal microbalance, polished quartz sensor and a Maxtek TM400 monitor) and QMS (quadrupole mass spectrometry, Stanford Research Systems RGA300) was used to study the deposition of ASA via Pathways 1 and 2 (FIG. 5A). Pathway 1 (material is designated AZ1) was carried out by immediately dosing the reactor with TMSiOH after the TMA dose-purge cycle. The methyl groups on TMSiOH (trimethylsilanol) were subsequently removed by ozone. For Pathway 2 (material is designated AZ2), a water dose-purge step was inserted before the TMSiOH dose. Throughout the experiment, ultra-high purity (99.999%) nitrogen carrier gas continuously passed through the flow tube. For deposition, the QCM and the chamber is maintained 150° C. Ozone (10% wt) was generated by passing ultrahigh purity $O_2$ (280 sccm) through an ozone generator (PacificOzone). The QCM's surface is passivated prior to each study by depositing at least 30 cycles of $Al_2O_3$ using TMA (trimethylaluminum)-water. NIST mass spectra were used to determine m/z values to monitor using QMS. Trimethylaluminum was monitored at m/z=57, TMSiOH at m/z=75, methane at m/z=15, ozone at m/z=48, $CO_2$ at m/z=44, water at m/z=17. Lab-scale synthesis of ASA for catalytic testing was conducted using a similar tubular viscous flow reactor equipped with a resistively heated sample holder to facilitate rapid localized heating of the powder substrate. A typical ASA synthesis involved loading approximately 200 mg of the mesostructured silica MSU-F (Claytec Inc, 550 m$^2$/g; pore size=22 nm) into the holder. The sample was allowed to equilibrate to 200° C. for 30 mins prior to the dosing of TMA-TMSiOH with a dose-purge interval of 120-300-120-300 seconds. Silica ALD was performed at 400° C. using TMSiOH-$O_3$ with dose-purge interval of 300-600-600-300 seconds.

Figures 6A, 6B, 6C, 6D:
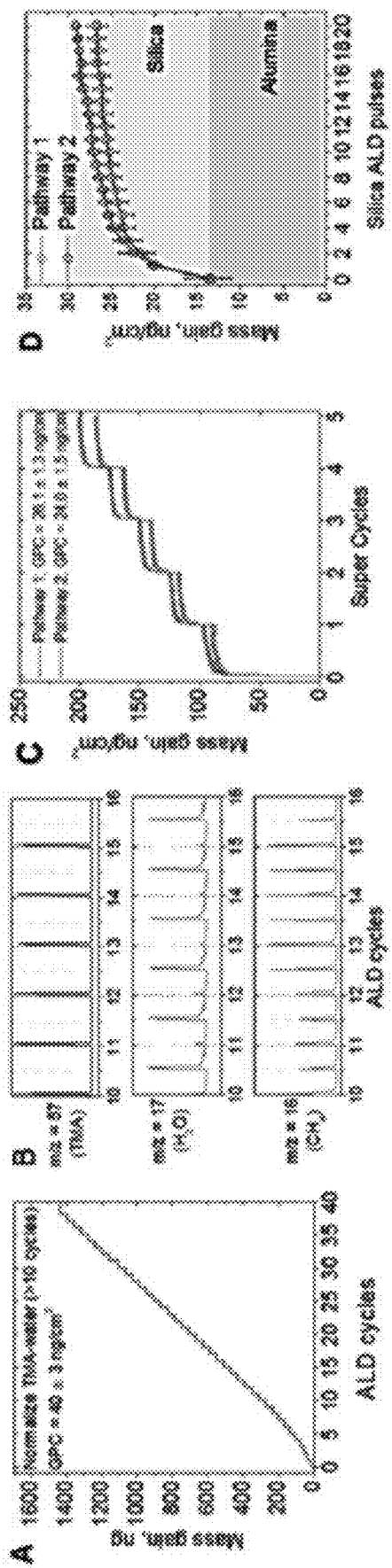
FIG. 6A shows in-situ QCM data for TMA-water gave 40±3 ng/cm$^2$ growth per cycle and FIG. 6B illustrating the corresponding QMS data showing the evolution of $CH_4$ during both the TMA and water exposures.
FIG. 6C shows in-situ QCM studies for ASA using Pathway 1 and 2 gave similar growth rates of 26.1±1.3 and 24.0±1.5 ng/cm$^2$ respectively.
FIG. 6D shows mass gain values versus the number of silica ALD cycles average of five super cycles. Steric effects of the newly deposited $SiO_2$ inhibit access to the surface Al that is essential for the chemisorption of TMSiOH. This might explain the decrease in the amount of $SiO_2$ deposited with each succeeding cycle.
Figures 6E, 6F, 6G, 6H:
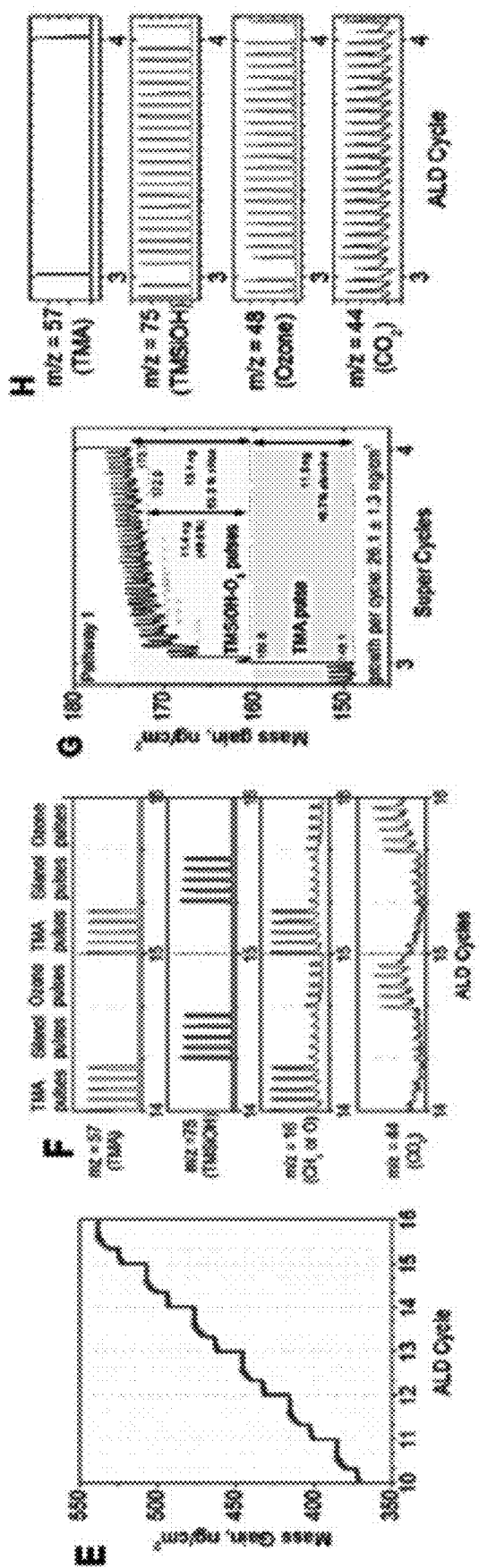
FIG. 6E shows in-situ QCM studies for Pathway 1 using 5 micropulses of each TMA, TMSiOH, and $O_3$.
FIG. 6F shows in-situ QMS for E showing that methane is both release during the TMA and TMSiOH pulses, thus, the detection of $CO_2$ is consistent with the removal of the Si—$CH_3$ groups through combustion.
FIG. 6G shows in-situ QCM studies for Pathway 1 super cycle with a single TMA pulse followed by 20 pulses of TMSiOH-$O_3$.
FIG. 6H shows a corresponding in-situ QMS during the super cycle in FIG. 6(g)(Signals monitored: TMA (m/z=57), TMSiOH (m/z=75), $O_3$ (m/z=48) and $CO_2$ (m/z=44)

To evaluate TMSiOH for silica ALD, in-situ QCM and QMS measurements were employed. Two synthetic pathways were investigated for the ALD of ASA as illustrated in FIG. 5A. Pathway 1 (material is designated AZ1) skips the traditional water step after the TMA exposure while Pathway 2 (resulting material is AZ2) includes the water exposure after TMA to produce aluminum oxide before the TMSiOH exposure. This was done to evaluate the effect of skipping the water step in Pathway 1 and in a way, to test the reproducibility of the chemical process. In-situ QCM studies for TMA-water gave 40±3 ng/cm$^2$ growth per cycle (FIG. 6A). In-situ QMS for the TMA-water process shows the evolution of $CH_4$ during both the TMA and water exposures (FIG. 6B). Pathways 1 and 2 have similar growth rates of 26.1±1.3 and 24.0±1.5 ng/cm$^2$ respectively as shown in FIGS. 6C and 6D suggesting that the water exposure following the TMA has little effect on the silica ALD. Moreover, the incremental mass gain for silica diminishes with each successive TMSiOH-$O_3$ cycle, suggesting that the Al centers are vital to the silica deposition. The Pathway 1 super cycle consists of 1 cycle TMA and 20 cycles of TMSiOH-$O_3$ while the Pathway 2 super cycle consists of 1 cycle TMA-water followed by 20 cycles of TMSiOH-$O_3$. Steric effects of the newly deposited $SiO_2$ inhibit access to the surface Al that is essential for the chemisorption of TMSiOH. This might explain the decrease in the amount of $SiO_2$ deposited with each succeeding cycle. FIG. 6E show the QCM data for the growth of $SiO_2$ using five micropulses of TMA-TMSiOH-$O_3$. The in-situ QMS (FIG. 6F) for TMA-TMSiOH-$O_3$ showed the release of methane (m/z=16) during TMA (m/z=57) chemisorption as expected. Ozone treatment removed the surface methyl groups to form $CO_2$ as evidenced by the signal detected at m/z=44 (FIGS. 6F and 6H).

In-Situ ALD-FTIR

In-situ transmission FTIR-ALD experiments were conducted using a separate reactor described previously. The data were recorded using a Thermo Scientific Nicolet E700 FTIR spectrometer. The detector was cooled with liquid nitrogen that is housed in a metal boxed purged with ultra-high purity nitrogen. For a typical experiment, mesostructured silica (MSU-F Claytec Inc, 550 m$^2$/g; pore size=22 nm) is pressed on a stainless steel grid then mounted onto a resistively heated stage. Prior to deposition, the sample is heated and ozone treated at 400° C. for 15 mins to remove adsorbed water and hydrocarbons. FTIR spectra were recorded with 50 scans at resolution of 2 cm$^{-1}$. Throughout each dosing step, the gate valves in front the IR window were shut to prevent deposition and were opened after the purging step by a trigger in the ALD program. Deposition of aluminum oxide was done using TMA-water dose-purge cycles. To ensure precursor saturation on the surface or completion of reaction, multiple pulses were performed until no further changes in the intensity of characteristic peaks (e.g. C—H stretch for TMA) were observed. For TMA-water, the dose-purge time cycles used were 60-90-60-90 s. For TMSiOH-ozone, the dose-purge time cycles are 60-90-600-60 at 400° C. Unlike the in-situ QCM and QMS studies where ozone easily removed the methyls in TMSiOH at 150° C. on the planar QCM and reactor wall surfaces, it was found that the temperature for silica ALD had to be raised to 400° C. to remove the methyls of TMSiOH inside of the porous silica. Pyridine adsorption studies were done in-situ at 100° C. by dosing about 0.3 Torr pyridine into the sample under ALD conditions. The gate valve for the IR window is shut off during the pyridine dose to prevent adsorption on the IR windows. To observe the changes on the surface, a background spectrum is taken before pyridine adsorption. In this manner, only the changes induced by the pyridine adsorption are shown in the difference spectra. Saturation of pyridine was achieved when no further changes in the pyridine peaks were observed in the spectrum. For temperature programmed desorption, the stage was heated successively to 200, 300 and 400° C., and the sample stage was cooled to 100° C. before the spectrum scan. Performing all of the FTIR measurements at a constant temperature of 100° C. eliminated artefacts due to changes on the sample and on the IR windows. The remaining adsorbed pyridine was removed by ozone treatment at 400° C. prior to the next round of $SiO_2$ ALD.

In-situ FTIR measurements complemented the in-situ QCM and QMS studies and were used to monitor the surface species at each step of the synthesis. Difference spectra for a typical TMA-water cycle for alumina ALD are shown in FIG. 6I. The chemisorption of TMA on silica is accompanied by the consumption of silanols as shown by the negative Si—OH peak (3745 $cm^{-1}$) and the appearance of positive features due to the alkane C—H stretches (~2800-3000 $cm^{-1}$) from TMA. Subsequent water exposure generated broad Al—OH stretches and the consumption of the C—H stretch. FIG. 6J shows the difference spectra for Pathway 1. Similar to the TMA-water process, TMA chemisorption consumed Si—OH. Subsequent TMSiOH dosing produced a different set of C—H stretch due to Si—$CH_3$. These Si—$CH_3$ groups are converted to Si—OH by $O_3$ at 400° C. This is confirmed by the negative C—H stretching peak and the generation of a positive Si—OH peak FIG. 6K after the $O_3$ dose-purge cycle.

FTIR also revealed the importance of surface Al for the chemisorption of TMSiOH. Adsorption of TMSiOH on bare silica is negligible as evidenced by the very weak C—H stretch (red curve, FIG. 6K). However, after depositing Al on that same silica surface by exposure to TMA, TMSiOH is adsorbed more effectively as indicated by the greater intensity of the C—H stretching peak. The FTIR also revealed the reduced adsorption of TMSiOH with each successive silica ALD cycle, on the Al-terminated surface, consistent with the QCM results. This also suggests that as the Al center becomes coated by silica, the silica ALD terminates.

Figure 6L:
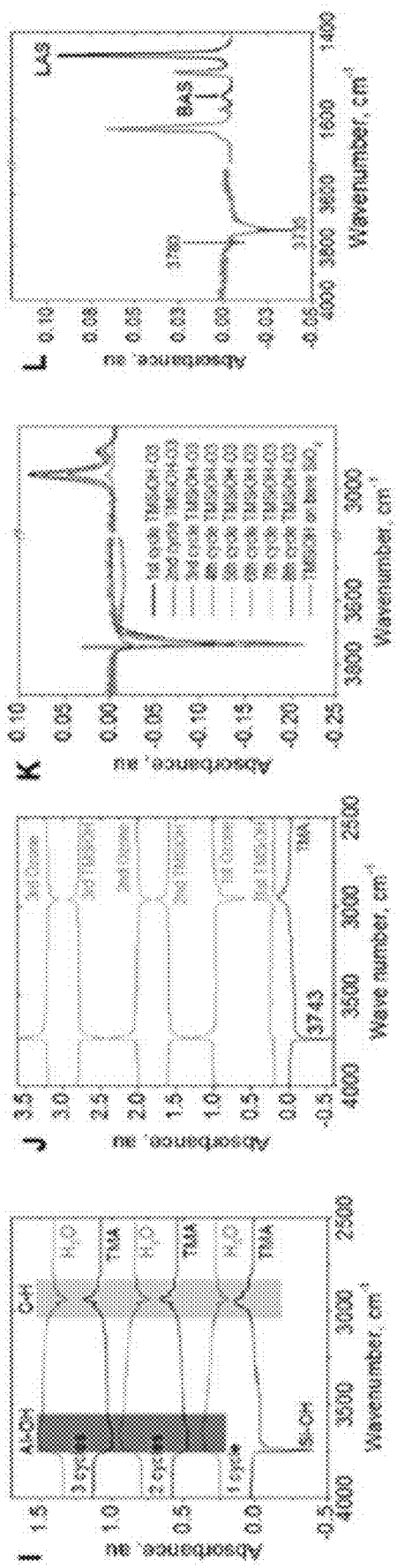

It should be appreciated that heating silica to 400° C. (as required for the silica ALD on porous substrates) may cause some restructuring. However, the silica used in the described examples had been calcined previously at 600° C. for 6 hours which made it highly condensed. Nevertheless, control experiments were conducted to observe this effect by comparing the acid site distribution changes before and after calcination for 1 cycle aluminum oxide on silica. FIG. 6L shows that heating to 400° C. developed some BAS but the amount is no more than the best ex-situ calcined materials.

Solid State NMR Studies

Solid-state NMR spectroscopy is an important tool for investigating oxygen coordination, local symmetry, and the nature and concentration of aluminum and proton species within framework and extra-framework positions in zeolites and silica-alumina. It offers the advantage of studying acid sites, catalytic actives centers and binding sites by combining multinuclear NMR techniques such as $^1H$, $^{27}Al$ and $^{29}Si$-MAS-NMR. $^{27}Al$-MAS-NMR has been widely used to study the coordination state and distribution of aluminum atoms within framework and extra-framework positions, and consequently unique chemical shift ranges have been identified for the for 4, 5 and 6-coordinate environments. Four coordinate framework aluminum atoms typically resonate at 50-60 ppm, whereas five and six-coordinate extra-framework species resonate at 25 to 30, and −17 to 13 ppm, respectively.

$^1H$ NMR is typically used to investigate the acidity of the zeolite and defect sites in the zeolite framework created during synthesis, dehydration or catalytic reactions. $^1H$ chemical shifts for environments in pristine zeolites and silicates are in −0.5 to 8 ppm range. Typical chemical shifts for Bronsted acid sites in zeolites are in the range of 3.2 to 5.2 ppm and depend on the position of the site and the mean electronegativity of the zeolitic framework. Silanol groups on the surface and defect sites give resonances between 1.2-2.4 ppm and can be shifted downfield in the case of hydrogen bonding. Shifts for —OH group of extra-framework aluminums are in the range of 0.6 to 3.6 ppm, and adsorbed water gives relatively broad peak around 4.6-5.0 ppm.

$^{27}Al$ MAS NMR experiments were performed on a Bruker Avance III 500 MHz spectrometer (11.7 Tesla superconducting magnet) with a 2.5 mm MAS probe operating at 30 kHz spinning speed. The spectra were referenced to 1M $Al(NO_3)_3$ at 0 ppm and single pulse experiments were performed with a pulse width of 1.0 µs and a recycle delay of 1 s. $^1H$ MAS NMR experiments were acquired on a Bruker Avance III 300 MHz spectrometer (7.05 Tesla) with a 1.3 mm MAS probe at a spinning speed of 67 kHz. All proton spectra were referenced to TMS at 0 ppm and single pulse experiment was used with a π/2 pulse width of 1.4 µs and a recycle delay of 1 s. For $^{27}Al$ MQMAS NMR experiments, a standard, z-filter triple quantum MAS pulse sequence with two hard pulses followed by a soft 90 degree solid pulse was applied. The experiment was performed at a 30 kHz spinning rate and optimized parameters were set by using $Al_2O_3$ as a reference sample. $^{27}Al$ MQMAS data analysis and deconvolutions of single pulse data was performed by data analysis package (TopSpin® software). Hydrated samples (samples off-the-shelf), pyridine adsorbed samples and dehydrated samples were analyzed. Pyridine adsorption was done by letting pyridine vapor pass through as bed of ASA material. Dehydrated samples were prepared by placing sample inside an air-free flask (ChemGlass) and then connected to a Schlenk line. The flask is heated to 200° C. under dynamic vacuum for 16 hours. The sample is charged with $N_2$ before being disconnected from the vacuum line. Dehydrated samples were stored and packed inside a glove box before NMR analysis.

In order to study the nature of the proton species before and after ALD treatments and pyridine adsorption, $^1H$ MAS NMR experiments were performed. As seen in FIG. 11A pristine amorphous silica shows a major resonance around 1.2 ppm due to mostly isolated silanol groups and broad peaks in 2.4-3.0 ppm region due to H-bonded and germinal silanol groups. The overall spectrum is relatively broad due to a distribution of different proton sites within the amorphous silica structure. An additional peak abound 0.5 ppm is also observed for pristine silica which may be due to residual alkyl proton impurities coming from synthesis. Deposition of (FIG. 11B) 1 cycle TMA-water resulted to the formation of a broad peak around 3.8 ppm which can be assigned as hydrogen bonded Al—OH species due to surface hydroxides and extra-framework hydroxides. Furthermore a major peak at −1.2 ppm and a peak around 0 ppm is clearly seen which can be assigned to protons of Al—$CH_3$ and Si—$CH_3$ species formed upon reaction of TMA on silica surface. The formation of Si—$CH_3$ species with TMA has been reported in literature. However, the surprising stability of the detected Al—CH₃ species against water or exposure to atmospheric moisture suggest that the Al—CH₃ species is confined inside of cavities that water cannot access and consequently inaccessible to pyridine molecule as well.

FIG. 11B shows the deconvolution of the ASA materials with 1 cycle TMA-water and 1 cycle TMA+2 cycle $SiO_2$ before and after calcination at 550° C. Al—CH₃ and Si—CH₃ proton resonances decreased after thermal treatment. The spectra for the as-synthesized (1) 1 cycle TMA-water reveals that the broad 3.8 ppm proton resonance is different from other samples suggesting the presence of mostly H-bonded Al—OH groups in the 1 cycle TMA sample. The proton peaks observed at 3.5-3.6 ppm for samples 2-4 is attributed to Bronsted acidic protons. It has to be noted that none of these samples were treated/handled in inert atmosphere, therefore a broad proton peak around 5.7 ppm due to adsorbed water was observed in ¹H MAS NMR.

²⁷Al MAS NMR experiments were used to probe the changes in the coordination and local environments of aluminum before and after $SiO_2$ ALD on a 1 cycle TMA-water sample. As shown in FIG. 11E spectrum (1), 1 cycle TMA-water on a silica surface shows at least three major aluminum peaks at around 55, 32 and 5 ppm corresponding to 4-, 5- and 6-coordinated aluminum environments, respectively. Comparing the relative intensities of these signals, the major environment is 6-coordinate aluminum sites, followed by 4-coordinate and a distorted 5-coordinate aluminum environments. Atomic layer deposition of two cycles of $SiO_2$ (FIG. 11E spectrum (2)), produces considerable changes in the relative intensities of the tetrahedral and octahedral aluminum environments which is a signature of formation of framework Si—O—Al sites. As more $SiO_2$ is deposited (+8 cycles $SiO_2$), a significant line broadening is observed for all of the 4-, 5-, and 6-coordinations due to increased second order quadrupolar interaction and distribution of aluminum environments as a result of disorder/asymmetry introduced into the structure (FIG. 11E spectrum (3)).

To confirm the DFT predicted structures and the in-situ ALD-FTIR results, samples for NMR analysis were dehydrated to simulate the conditions used during DFT calculations and pyridine adsorption FTIR studies. FIG. 4C shows the 1H-NMR spectra for 1 cycle TMA+3 cycles of $SiO_2$ before and after pyridine adsorption. As seen in the figure, proton peaks within 1.2 to 3.6 ppm, assigned as isolated and H-bonded silanol groups, are significantly reduced indicating consumption of silanol protons, consistent with the FTIR results. New resonances around 7-8 ppm are formed due to pyridine adsorption. FIGS. 11C and 11D show the ²⁷Al-NMR spectra for dehydrated 1 cycle TMA+3 cycles of $SiO_2$ before and after pyridine adsorption, respectively. There is a significant increase in the local order of different aluminum coordinations with pyridine adsorption as followed by the aluminum peak shape/width change and calculated quadrupolar coupling constant values, in comparison with the dehydrated sample. This is also commonly observed with dehydrated zeolites where dehydration forms disturbed aluminum sites giving distorted aluminum-27 NMR peak shapes and large quadrupolar coupling constant values ($C_Q$). After pyridine adsorption the ²⁷Al NMR peak shapes get sharper and more symmetrical, reducing Ca values. ²⁷Al NMR data comparison of the two samples, reveals a significant change in the relative intensities of different aluminum coordinations from tetrahedral to octahedral aluminum sites. This can be explained by conversion of distorted tetrahedral aluminum sites to more symmetric octahedral environments by pyridine adsorption, consistent with the predicted DFT structures. The deconvolutions and calculated line shape parameters of the single pulse ²⁷Al MAS NMR data was also supported by the ²⁷Al MQMAS experiments as shown in FIG. 4D and FIG. 11C-11D. The isotropic chemical shifts and $C_Q$ values obtained, are in agreement with the simulated and calculated values obtained individual slices taken at the center of gravity of the 2D contours of the MQMAS data.

Theoretical Calculations for Examples

In the examples, a hydroxylated (1×2) α-cristobalite (011) surface was used as the model for support silica. The surface slab has hydroxyl groups on both sides. The hydroxyl coverage/density in the model is 0.047 per Å², consistent with the experimental —OH coverage on amorphous silica at similar temperature. For the final ASA structures, the ALD process used for synthesis regenerates the —OH thus the alumina and silica deposited on the surface are either bound to support through bridging bond and/or terminated with —OH. Therefore, the structures of the ASA can be simplified and constructed by following the condensation between precursors $Al(OH)_3$ or $Si(OH)_4$ with the support surface silanol groups $Si_{support}$—OH:

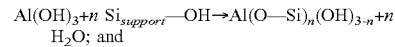

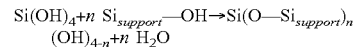

All structures and energies were calculated using the PW91 DFT method with plane-wave basis sets as implemented in VASP. The core electrons were described by the ultrasoft pseudo-potentials with cutoff energies of 400 eV for all atoms. The ℘-point and a 2×2×1 k-point mesh were used to sample the Brillouin zones in the gas phase cluster and supported cluster calculations, respectively. In cluster calculations, all atoms were allowed to relax; in the silica-supported cluster calculations, atoms in the bottom half of the surface slab were kept frozen while those on top of the slab, along with atoms in the sub-monolayer silica and alumina, were allowed to relax. After the surface structures were determined with the periodic VASP calculations, the active center was truncated from selected surface structures to study their vibrational frequencies. These cluster models are terminated with OH groups as shown in FIG. 13A. These structures were first optimized with terminating OH bond lengths fixed at a hydroxyl distance of 0.97 Å along the direction of the Si atom in the periodic structure. Gaussian suite was used for these calculations with the method combination of B3LYP/6-31+G(d). Then the frequency calculations were performed at the optimized structures of the cluster models with the same level of theory. All calculated frequencies are then scaled by a factor of 0.98. The scaling factor value was chosen so the scaled silanol frequency agrees exactly with the experimental value.

Structure A2 is a 3-coordinate Al upon the addition of silica described in FIG. 4A. However, this structure is 0.82 eV less stable as opposed to silanol interacting or forming a bridging hydroxyl structure (A1). However, A1 was discounted due to the lack of consumed bridging OH observed in the IR after pyridine adsorption. Al coordination observed in the ²⁷Al-NMR are 4, 5 and 6. A 4-coordinate Al structure such as B1 and B2 are more stable relative to A1. In addition, 5 and 6 coordinate Al such as C1 and C2 are also stable. However, B2 and C2 are relatively less stable compared with their counterparts, B1 and C1, respectively. In addition, the characteristic vibration of bridging hydroxyl in B2 and C2 structures was not observed in experimental FTIR measurement, making them unlikely structures. This leaves B1 and C1 as structures consistent with the FTIR and NMR analyses. The condensation of the incoming silica with the surface silanol was observed experimentally via in-situ FTIR-ALD (FIG. 6K). The very weak C—H stretch for bare silica (red curve) is evidence that very little trimethylsilanol is adsorbed on the bare silica surface as opposed to materials with 1 cycle aluminum oxide. This also suggest that an acidic center is needed to adsorb trimethylsilanol effectively. The amount of trimethylsilanol decreases with increasing cycles of $SiO_2$. Furthermore, a similar DFT study on the grafting orthosilicic acid ($Si(OH)_4$) done on $\gamma$-$Al_2O_3$, sowed that the second molecule of $Si(OH)_4$ condenses with the previously grafted silica center instead of the $\gamma$-$Al_2O_3$ surface.

Figure 4F:
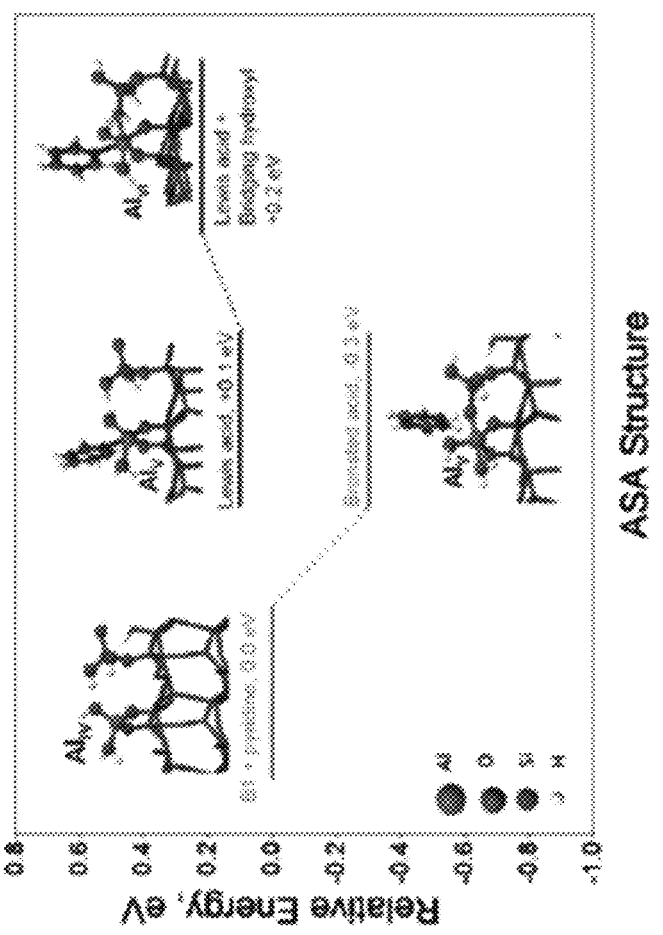

To explain the BAS of silanol observed during pyridine adsorption, pyridine was introduced to B1 and C1. B1 shows that proton transfer can occur if the deprotonated Si—O species can form a Si—O—Al bridge. This effectively changes the coordination from 4 to 5 (FIG. 4B). If C1 is to act similarly as a BAS, the structure is energetically neutral (FIG. 4F), not as favored as B1. Therefore, C1 is more likely to behave as a LAS than BAS (FIG. 4F). This DFT prediction is in excellent agreement with the FTIR and NMR experiments done for 1 cycle TMA+3 cycle $SiO_2$ material.

To explain the Lewis acidity of the surface aluminated materials (i.e. 1 cycle TMA-water), further DFT calculations were done and the models were tested with FTIR. DFT calculations for C1 (4-coordinate Al with $1H_2O$ molecule), E1 (5-coordinate Al with $2H_2O$ molecule) and G1 (6-coordinate Al with $3H_2O$) as LAS are shown in FIG. 13B to 13D. Adsorption of pyridine on D1 and E1, leading to D2 and F1 as final structures, respectively, increases the coordination numbers of Al sites in these structures. This adsorption is energetically unfavorable for D1 (4 to 5-coordinate) but favorable for E1 (5 to 6 coordinate). However, if D2 can revert to its initial 4-coordination by losing water, the process becomes energetically neutral (D1). This meant that pyridine and water can displace each other very easily on these LAS. Additionally, G1 also has a near neutral ligand exchange with pyridine that result to F1 (FIG. 13D). These exchanges of pyridine for water contribute to the LAS observed experimentally.

As a quick test for the ligand exchange (pyridine-water) for D1 and C1, 1 cycle TMA-water was deposited using the in-situ FTIR-ALD. Pyridine was then adsorbed to the surface followed by a water dose and finally, another pyridine dose. The results are in FIG. 13E. Like previous results, the material is almost exclusively LAS. However, upon dosing of water, the Lewis acid bound pyridine was drastically diminished (FIG. 13E (2)). Interestingly, the re-exposure to pyridine after the water dose restored the LAS peak (FIG. 13E (3)). The leftover LAS peak after water exposure might be due to either the E1 to F1 mode of adsorption or the thermodynamic equilibrium between the bound water and pyridine. Similar results were also observed for a calcined 5 cycles TMA-water material (FIG. 13F). The ligand exchange was done by initially adsorbing pyridine (1) on the Lewis sites. The water exchange was done by dosing water (2) on the pyridine loaded sample. Finally, pyridine is reintroduced to again exchange with water (3) where there is an observed restoration of LAS signal for both samples. The leftover LAS peak after water exposure might be due to either the E1 to F1 mode of adsorption or the thermodynamic equilibrium between the bound water and pyridine.

These provide some proof for the athermic nature of water-pyridine ligand exchange on the LAS for surface aluminated materials.

$NH_3$ Temperature Programmed Desorption

Temperature programmed desorption (TPD) experiments were carried out using an apparatus comprised of a tube furnace connected to a variable power-supply and PID temperature controller (Love Controls) with a K-type thermocouple (Omega). Catalysts were loaded into the fritted quartz tube, pre-treated in flowing He (30 $cm^3$ (STP) $min^{-1}$) at 400° C. (1° C. $min^{-1}$ ramp, 30 min). $NH_3$ adsorption was performed at 150° C. using 1% $NH_3$ in He, with a flow-rate of 30 $cm^3$ (STP) $min^{-1}$. After $NH_3$ adsorption, the sample was purged with flowing He (100 $cm^3$ (STP) $min^{-1}$) at 150° C. until the $NH_3$ signal returned to baseline (~120 min) to ensure that all physisorbed $NH_3$ had been removed. The He flow-rate was adjusted to 30 $cm^3$ (STP) $min^{-1}$ followed by initiation of a temperature ramp at 10 K $min^{-1}$ from 150° C. to 700° C. The effluent from the reactor was analysed using an OmniStar Gas Analyzer (Pfeiffer Vacuum, Model GSD 320) using the SEM detector. The number of acid sites was quantified by numerical integration of the mass 17 ($NH_3$) signal minus the mass 17 contribution from water. (The ratio of mass 18 to mass 17 is 100:21 according to NIST). The mass signal 15 (NH), generally used to quantify $NH_3$, could not be used due to interference with the desorption of residual $CH_3$ group left over from the ALD synthesis.

$N_2$ Physisorption

Nitrogen physisorption isotherms were recorded at liquid nitrogen temperature (77 K) using an ASAP 2020C (Micromeritics). Samples were degased for 12 hours at 110° C. under dynamic vacuum. The Brunauer-Emmett-Teller (BET) method was used to determine the surface area, and the Barret-Joyner-Halenda (BJH) method were used to determine pore size and volume.

Catalytic Studies

Dehydration of Fructose to HMF:

The catalytic performance of each catalyst in fructose dehydration (a Bronsted acid catalyzed reaction) was examined in a batch reactor. All reactions were performed using 20 mg of as synthesized catalyst and 4.0 g of 4:1 THF:water (w/w) containing 2 wt % fructose. Reactions were carried out in thick-walled glass reactors (10 mL, Alltech), stirred using triangular magnetic stirring bars at 700 rpm and immersed in an oil bath maintained at 130° C. for 3 h. The reactors were sealed using Teflon liners (Alltech) inserted into plastic caps. Reactions were quenched by submerging the reactors in a water-ice bath. Products were analyzed using a Waters e2695 HPLC system equipped with a 2998 photodiode array detector and a 2414 refractive index detector, using an Aminex HPX-87P column (Biorad) at 85° C. with Milli-Q water as the mobile phase at a flow rate of 0.6 mL $min^{-1}$. The disappearance of fructose was monitored using a refractive index detector, while 5-hydroxymethyl-furfural (HMF) production was monitored using a UV detector (320 nm).

Meerwein-Ponndorf-Verley-Oppenauer Reduction/Oxidation (MPVO):

Each catalysts was also tested for the catalytic transfer hydrogenation (Meerwein-Ponndorf-Verley-Oppenauer reduction/oxidation, MPVO, a Lewis acid catalyzed reaction) of cyclohexanone using isopropanol as the hydrogen donor. All reactions were performed using 20 mg of as synthesized catalyst in 4.0 g of feed (2% cyclohexanone, 30% isopropanol, 68% decane, w/w/w). Reactions were carried out in thick-walled glass reactors (10 mL, Alltech), stirred using triangular magnetic stir bars at 700 rpm and immersed in an oil bath maintained at 130° C. for 17 h. The reactors were sealed using Teflon liners (Alltech) inserted into plastic caps. Reactions were quenched by submerging the reactors in a water-ice bath. Products were analyzed using a Shimadzu GC2010 equipped with an Agilent DB-5MS-UI column.

Synergy Between BAS and LAS Probed by Glucose to HMF Cascade Reaction:

The synergy between Bronsted and Lewis acid sites was probed by the cascade reaction of glucose to fructose to HMF. The isomerization of glucose to fructose is Lewis acid catalysed while the dehydration of fructose to HMF is Bronsted acid catalysed. All reactions were performed using the same number of total acid sites loaded into the reactor (as determined by $NH_3$ TPD) 4.0 g of 4:1 THF:water (w/w) containing 2 wt % glucose. Reactions were carried out in thick-walled glass reactors (10 mL, Alltech), stirred using triangular magnetic stirring bars at 700 rpm and immersed in an oil bath maintained at 140° C. for 5 h. The reactors were sealed using Teflon liners (Alltech) inserted into plastic caps. Reactions were quenched by submerging the reactors in a water-ice bath. Products were analyzed using a Waters e2695 HPLC system equipped with a 2998 photodiode array detector and a 2414 refractive index detector, using an Aminex HPX-87P column (Biorad) at 85° C. with Milli-Q water as the mobile phase at a flow rate of 0.6 mL min$^{-1}$. The disappearance of glucose and the formation of fructose were monitored using a refractive index detector, while 5-hydroxymethylfurfural (HMF) production was monitored using a UV detector (320 nm).

TABLE 1

Acid site concentration and distribution

| Material | Temperature | [Si—OH]* | [BAS]* | [LAS]* | % Acid site conversion† % BAS | % LAS | Distribution of acid site‡ % BAS | % LAS | Total Acid sites, [BAS] + [LAS] |
|---|---|---|---|---|---|---|---|---|---|
| Pathway 1 | ° C. | ×100 μmol | ×100 μmol | ×100 μmol | % BAS | % LAS | % BAS | % LAS | ×100 μmol |
| 1c SiO$_2$ | 100 | 100.7 | 23.6 | 89.5 | 20.9 | 79.1 | 20.9 | 79.1 | 113.1 |
|  | 200 | 81.5 | 9.3 | 55.6 | 8.2 | 49.2 | 14.3 | 85.7 | 64.9 |
|  | 300 | 50.1 | 5.2 | 42.1 | 4.6 | 37.2 | 11.0 | 89.0 | 47.3 |
|  | 400 | 39.4 | 0.0 | 29.5 | 0.0 | 26.1 | 0.0 | 100.0 | 29.5 |
| 2c SiO$_2$ | 100 | 110.6 | 35.4 | 48.4 | 31.3 | 42.8 | 42.2 | 57.8 | 83.8 |
|  | 200 | 91.6 | 21.5 | 28.2 | 19.0 | 24.9 | 43.3 | 56.7 | 49.7 |
|  | 300 | 55.9 | 9.1 | 24.1 | 8.0 | 21.3 | 27.4 | 72.6 | 33.2 |
|  | 400 | 39.0 | 0.0 | 15.1 | 0.0 | 13.4 | 0.0 | 100.0 | 15.1 |
| 3c SiO$_2$ | 100 | 67.4 | 32.6 | 19.5 | 28.9 | 17.2 | 62.6 | 37.4 | 52.1 |
|  | 200 | 37.5 | 20.3 | 12.1 | 17.9 | 10.7 | 62.7 | 37.3 | 32.4 |
|  | 300 | 23.5 | 10.3 | 9.2 | 9.1 | 8.1 | 52.8 | 47.2 | 19.5 |
|  | 400 | 13.5 | 2.4 | 8.8 | 2.1 | 7.8 | 21.4 | 78.6 | 11.2 |
| 4c SiO$_2$ | 100 | 56.4 | 24.9 | 14.7 | 22.0 | 13.0 | 62.9 | 37.1 | 39.6 |
|  | 200 | 43.0 | 16.7 | 8.7 | 14.8 | 7.7 | 65.8 | 34.2 | 25.4 |
|  | 300 | 24.6 | 7.4 | 5.4 | 6.6 | 4.8 | 57.9 | 42.1 | 12.8 |
|  | 400 | 12.1 | 0.7 | 5.0 | 0.6 | 4.4 | 12.6 | 87.4 | 5.7 |
| 5c SiO$_2$ | 100 | 39.5 | 24.3 | 5.8 | 21.5 | 5.1 | 80.7 | 19.3 | 30.1 |
|  | 200 | 26.2 | 14.6 | 3.5 | 12.9 | 3.1 | 80.6 | 19.4 | 18.1 |
|  | 300 | 14.9 | 6.9 | 2.7 | 6.1 | 2.4 | 71.8 | 28.2 | 9.6 |
|  | 400 | 5.3 | 2.8 | 2.5 | 2.4 | 2.2 | 52.4 | 47.6 | 5.3 |
| 6c SiO$_2$ | 100 | 40.9 | 17.7 | 6.9 | 15.7 | 6.1 | 72.0 | 28.0 | 24.6 |
|  | 200 | 26.4 | 11.4 | 5.3 | 10.1 | 4.7 | 68.2 | 31.8 | 16.7 |
|  | 300 | 15.6 | 5.4 | 4.2 | 4.8 | 3.7 | 56.2 | 43.8 | 9.6 |
|  | 400 | 8.8 | 0.7 | 3.2 | 0.6 | 2.8 | 17.1 | 82.9 | 3.9 |
| 7c SiO$_2$ | 100 | 37.0 | 21.4 | 5.1 | 19.0 | 4.5 | 80.8 | 19.2 | 26.5 |
|  | 200 | 28.2 | 12.8 | 3.7 | 11.3 | 3.3 | 77.6 | 22.4 | 16.5 |
|  | 300 | 15.5 | 6.0 | 3.7 | 5.3 | 3.3 | 61.8 | 38.2 | 9.7 |
|  | 400 | 7.6 | 0.6 | 2.9 | 0.5 | 2.6 | 17.1 | 82.9 | 3.5 |
| 8c SiO$_2$ | 100 | 28.9 | 19.1 | 3.3 | 16.9 | 2.9 | 85.3 | 14.7 | 22.4 |
|  | 200 | 21.5 | 12.6 | 2.4 | 11.1 | 2.1 | 84.0 | 16.0 | 15.0 |
|  | 300 | 10.7 | 6.9 | 1.9 | 6.1 | 1.7 | 78.5 | 21.5 | 8.8 |
|  | 400 | 0.0 | 0.0 | 2.0 | 0.0 | 1.8 | 0.0 | 100.0 | 2.0 |
| 9c SiO$_2$ | 100 | 26.2 | 12.6 | 1.8 | 11.1 | 1.6 | 87.5 | 12.5 | 14.4 |
| 10c SiO$_2$ | 100 | 6.7 | 11.4 | 1.5 | 10.1 | 1.3 | 88.4 | 11.6 | 12.9 |
|  | 200 | 14.7 | 6.1 | 0.9 | 5.4 | 0.8 | 87.2 | 12.8 | 7.0 |
|  | 300 | 7.4 | 1.4 | 0.6 | 1.3 | 0.5 | 70.5 | 29.5 | 2.0 |
|  | 400 | 2.7 | 0.0 | 0.5 | 0.0 | 0.4 | 0.0 | 100.0 | 0.5 |
| Pathway 2 |  |  |  |  |  |  |  |  |  |
| 0c SiO$_2$ | 100 | 0.00 | 0 | 44.6 | 0.00 | 99.9 | 0.0 | 100.0 | 44.6 |
| 1c SiO$_2$ | 100 | 49.0 | 18.1 | 26.5 | 40.6 | 59.4 | 40.6 | 59.4 | 44.6 |
| 2c SiO$_2$ | 100 | 46.0 | 18.9 | 15.7 | 42.4 | 35.1 | 54.7 | 45.3 | 34.6 |
| 3c SiO$_2$ | 100 | 30.9 | 17.3 | 8.2 | 38.7 | 18.3 | 67.9 | 32.1 | 25.4 |
| 4c SiO$_2$ | 100 | 21.6 | 13.5 | 4.2 | 30.2 | 9.4 | 76.3 | 23.7 | 17.7 |
| 5c SiO$_2$ | 100 | 13.8 | 11.5 | 2.9 | 25.9 | 6.6 | 79.7 | 20.3 | 14.5 |
| 6c SiO$_2$ | 100 | 13.4 | 9.1 | 1.7 | 20.4 | 3.8 | 84.2 | 15.8 | 10.8 |
| 7c SiO$_2$ | 100 | 11.3 | 8.4 | 1.2 | 18.9 | 2.8 | 87.3 | 12.7 | 9.7 |
| 8c SiO$_2$ Calcined | 100 | 10.7 | 7.1 | 1.1 | 15.8 | 2.5 | 86.2 | 13.8 | 8.2 |
| 1c TMA-water | 100 | 33.6 | 12.4 | 31.8 | NA | NA | 28.0 | 72.0 | 44.2 |
| 2c TMA-water | 100 | 23.0 | 9.8 | 23.7 | NA | NA | 29.1 | 70.9 | 33.5 |

TABLE 1-continued

Acid site concentration and distribution

| Material | Temperature | [Si—OH]* | [BAS]* | [LAS]* | % Acid site conversion[†] | | Distribution of acid site[‡] | | Total Acid sites, [BAS] + [LAS] |
|---|---|---|---|---|---|---|---|---|---|
| 3c TMA-water | 100 | 26.9 | 9.6 | 46.7 | NA | NA | 17.1 | 82.9 | 56.4 |
| 5c TMA-water | 100 | 13.8 | 3.3 | 32.3 | NA | NA | 9.3 | 90.7 | 35.7 |
| ZSM-5 | 100 | NA | 259.6 | 48.8 | NA | NA | 84.2 | 15.8 | 308.4 |
| Zeolite Y | 100 | NA | 144.3 | 74.7 | NA | NA | 65.9 | 34.1 | 219 |
| Al-MCM-41 | 100 | 28.9 | 9.2 | 20.9 | NA | NA | 30.6 | 69.4 | 30.1 |

NA-Not applicable
*Extinction coefficient used: [Si—OH] = 3.00 (25); [LAS] = 2.22(26); [BAS] = 1.67 cm/mol (26)
[†]BAS evolved from LAS. At 0 SiO$_2$ cycles, sites are 100% LAS. For Pathway 1, since no pyridine adsorption was done for 0 SiO2 ALD, total acid sites is [BAS] + [LAS] at 1c SiO$_2$.

$$\% \text{ Conversion} = \frac{[\text{acid site}] \times 100}{[\text{total acid site}]_{1c\ SiO2}},$$

assuming at 1 cycle SiO$_2$, BAS were all from LAS and no BAS has been loss to succeeding silica ALD

[‡]Calculated using $\% \text{ BAS} = \frac{[\text{BAS}] \times 100\%}{[\text{BAS}] + [\text{LAS}]}$; $\% \text{ LAS} = \frac{[\text{LAS}] \times 100\%}{[\text{BAS}] + [\text{LAS}]}$

TABLE 2

Summary of surface properties and catalytic testing

| Catalyst | Surface Area | Pore Size (Ads/Des) | NH$_3$ TPD (μmol g$^{-1}$) | Bronsted (μmol/g) from IR | Lewis (μmol/g) from IR | B:L ratio | Bronsted (μmol/g) From IR + TPD | Lewis (μmol/g) From IR + TPD | Rate of MPVO μmol min$^{-1}$g$^{-1}$ | Fructose Dehydration to HMF μmol min$^{-1}$g$^{-1}$ | Glucose to HMF min$^{-1}$ |
|---|---|---|---|---|---|---|---|---|---|---|---|
| 1cTMA + 2c SiO$_2$ | 330 | 20.3/11.9 | 185 | 51 | 64 | 0.8 | 82 | 103 | 2.39 | 1.12 | 0.021 |
| 1cTMA + 3c SiO$_2$ | 300 | 19.6/10.7 | 128 | 39 | 45 | 0.9 | 61 | 67 | 1.16 | 1.07 | 0.023 |
| 1cTMA + 4c SiO$_2$ | 276 | 19.3/10.8 | 98 | 34 | 25 | 1.4 | 57 | 41 | 0.53 | 0.96 | 0.026 |
| 1cTMA + 5c SiO$_2$ | 274 | 18.9/10.8 | 94 | 32 | 16 | 2.0 | 63 | 31 | 0.47 | 1.07 | 0.028 |
| 1cTMA + 7c SiO$_2$ | 280 | 18.7/10.6 | 86 | 24 | 8 | 2.9 | 64 | 22 | 0.35 | 0.98 | 0.025 |
| 1cTMA + 8c SiO$_2$ | 268 | 17.9/9.0 | 80 | 21 | 6 | 3.5 | 62 | 18 | 0.32 | 0.81 | 0.023 |

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of increasing Bronsted acidity creating an artificial zeolite, comprising:
    depositing aluminum on a silica substrate by atomic layer deposition (ALD), forming amorphous silica-alumina on a porous amorphous silica substrate, thereby forming a plurality of Lewis acid sites;
    depositing, on the porous amorphous silica substrate, a single atomic layer of a material having a silicon-oxygen species by atomic layer deposition comprising a trimethylsilanol (TMSiOH) exposure followed by an ozone exposure, wherein the depositing is repeated 0-7 times to form 1-8 atomic layers of the silicon-oxygen species; and
    forming a plurality of silanol functional groups on the porous amorphous silica substrate, thereby converting a portion of the Lewis acid sites into exposed surface Bronsted acid site.

2. The method of claim 1, wherein for a portion of the plurality of silanol functional groups, further comprising forming a bridge with an adjacent aluminum atom.

3. The method of claim 1, wherein the deposition of the aluminum-containing material comprises a single exposure to trimethyl aluminum (TMA).

4. The method of claim 3, wherein the deposition of the aluminum-containing material further comprises a water exposure following the single TMA exposure, followed by a purge and then the TMSiOH exposure.

5. The method of claim 4, wherein the deposition of the silicon-oxygen material comprises between 3 and 30 TMSiOH ALD cycles.

6. The method of claim 5, wherein after forming the plurality of Bronsted acid sites, the ratio of Lewis acid sites to Bronsted acid sites is 40:60.

7. The method of claim 1, wherein a plurality of Bronsted acid sites are added to the amorphous silica-alumina.

8. A method of creating an artificial zeolite, comprising:
    a first ALD deposition forming a silica-alumina layer on a substrate, the first ALD deposition comprising:
        an exposure to TMA; and
        an exposure to an oxiding precursor; and
    a second ALD deposition forming a Bronsted Acid site, the second ALD deposition comprising:

an exposure to a silanol precursor consisting of trimethyl silanol; and an exposure to ozone;

wherein the second ALD deposition comprises reacting the silanol precursor with either a trimethyl aluminum group or an aluminum hydroxide group of the silica alumina layer.

9. A method of increasing Bronsted acidity creating an artificial zeolite, comprising:

depositing aluminum on a silica substrate by atomic layer deposition, forming amorphous silica-alumina on a porous amorphous silica substrate thereby forming a plurality of Lewis acid sites;

depositing, on the porous amorphous silica, a single atomic layer of a material having a silicon-oxygen species by atomic layer deposition comprising a trimethylsilanol (TMSiOH) exposure followed by an ozone exposure; wherein the depositing is repeated 0-7 times to form 1-8 atomic layers of the silicon-oxygen species; and forming, by removal of methyl groups, a plurality of silanol functional groups on the porous amorphous silica substrate, thereby converting a portion of the Lewis acid sites into exposed surface Bronsted acid site.

* * * * *